(12) United States Patent
Shtukater

(10) Patent No.: US 10,353,463 B2
(45) Date of Patent: Jul. 16, 2019

(54) SMART CONTACT LENS WITH EYE DRIVEN CONTROL SYSTEM AND METHOD

(71) Applicant: Aleksandr Shtukater, Fair Lawn, NJ (US)

(72) Inventor: Aleksandr Shtukater, Fair Lawn, NJ (US)

(73) Assignee: RaayonNova LLC, Fair Lawn, NJ (US)

( * ) Notice: Subject to any disclaimer, the term of this patent is extended or adjusted under 35 U.S.C. 154(b) by 73 days.

(21) Appl. No.: 15/442,674

(22) Filed: Feb. 26, 2017

(65) Prior Publication Data

US 2017/0270636 A1    Sep. 21, 2017

Related U.S. Application Data

(63) Continuation-in-part of application No. 15/071,205, filed on Mar. 16, 2016.

(51) Int. Cl.
*G02C 7/04* (2006.01)
*G06F 3/01* (2006.01)
(Continued)

(52) U.S. Cl.
CPC ......... *G06F 3/013* (2013.01); *G02B 27/0093* (2013.01); *G02B 27/017* (2013.01); *G02B 27/0179* (2013.01); *G02C 7/04* (2013.01); *G02C 11/10* (2013.01); *G06F 3/011* (2013.01); *G06F 3/012* (2013.01); *G06F 3/017* (2013.01); *G06F 3/04842* (2013.01); *G06T 1/20* (2013.01); *G06T 3/20* (2013.01); *H04N 5/2257* (2013.01); *H04N 5/232* (2013.01); *H04N 5/23212* (2013.01); *H04N 5/23216* (2013.01); *H04N 5/332* (2013.01); *H04N 13/344* (2018.05); *H04N 13/383* (2018.05); *G02B 2027/014* (2013.01); *G02B 2027/0123* (2013.01); *G02B 2027/0127* (2013.01); *G02B 2027/0138* (2013.01); *G02B 2027/0187* (2013.01); *G06T 2200/24* (2013.01)

(58) Field of Classification Search
CPC ................................. G06F 3/013; G06F 3/017
See application file for complete search history.

(56) References Cited

U.S. PATENT DOCUMENTS 5,682,210 A * 10/1997 Weirich ............... G02B 27/017
                                                            345/32
6,351,273 B1 * 2/2002 Lemelson ............... G06F 3/013
                                                            704/271
(Continued)

FOREIGN PATENT DOCUMENTS

EP          1679577 A1 *  7/2006 ............. G06F 3/013
WO  WO-2014106330 A1 *  7/2014 ............... G02C 7/04

*Primary Examiner* — John Villecco

(57) ABSTRACT

A smart contact lens system is provided. The contact lens system comprises a contact lens substrate, an embedded display, and an onboard, embedded or off board, remote processor. The embedded display may form a part of the contact lens substrate. The embedded display is configured for outputting variety of UI components to the user. The processor is configured to shift at least a part of an image to a central position of the embedded display to bring the part of the image into focus on the embedded display and select UI component and optionally trigger it; thereby generating appropriate system event. Hence the entire system operation may be controlled with the eye(s).

21 Claims, 10 Drawing Sheets

(51) Int. Cl.
  *G06T 1/20* (2006.01)
  *G06T 3/20* (2006.01)
  *H04N 5/33* (2006.01)
  *G02B 27/00* (2006.01)
  *G02B 27/01* (2006.01)
  *G02C 11/00* (2006.01)
  *H04N 5/225* (2006.01)
  *H04N 5/232* (2006.01)
  *G06F 3/0484* (2013.01)
  *H04N 13/344* (2018.01)
  *H04N 13/383* (2018.01)

(56) References Cited

U.S. PATENT DOCUMENTS

| | | |
|---|---|---|
| 6,447,449 B1 | 9/2002 | Fleischman et al. |
| 6,579,235 B1 | 6/2003 | Abita et al. |
| 6,749,568 B2 | 6/2004 | Fleischman et al. |
| 7,169,106 B2 | 1/2007 | Fleischman et al. |
| 7,639,845 B2 | 12/2009 | Utsunomiya |
| 8,096,654 B2 * | 1/2012 | Amirparviz ...... B29D 11/00826 345/8 |
| 8,241,574 B2 | 8/2012 | Burles et al. |
| 8,336,387 B2 | 12/2012 | Tai et al. |
| 8,385,998 B2 | 2/2013 | Zhang |
| 8,446,341 B2 * | 5/2013 | Amirparviz .......... A61B 5/1455 250/221 |
| 8,857,981 B2 | 10/2014 | Pletcher et al. |
| 8,864,305 B2 | 10/2014 | Pletcher et al. |
| 8,870,370 B1 | 10/2014 | Otis et al. |
| 8,960,898 B1 | 2/2015 | Etzkorn et al. |
| 8,960,899 B2 | 2/2015 | Etzkorn |
| 8,965,478 B2 | 2/2015 | Liu |
| 8,971,978 B2 | 3/2015 | Ho et al. |
| 8,979,271 B2 | 3/2015 | Pletcher et al. |
| 8,985,763 B1 | 3/2015 | Etzkorn et al. |
| 8,986,240 B2 | 3/2015 | Dos Santos et al. |
| 8,989,834 B2 * | 3/2015 | Ho .................. A61B 3/101 600/381 |
| 9,047,512 B2 * | 6/2015 | Otis ................. G06K 9/00597 |
| 9,054,079 B2 | 6/2015 | Etzkorn |
| 9,055,902 B2 | 6/2015 | Liu |
| 9,063,351 B1 | 6/2015 | Ho et al. |
| 9,111,473 B1 | 8/2015 | Ho et al. |
| 9,113,829 B2 | 8/2015 | Etzkorn |
| 9,125,721 B2 | 9/2015 | Field |
| 9,155,653 B2 | 10/2015 | Field |
| 9,158,133 B1 | 10/2015 | Pletcher et al. |
| 9,161,712 B2 | 10/2015 | Etzkorn |
| 9,176,332 B1 | 11/2015 | Etzkorn et al. |
| 9,184,698 B1 | 11/2015 | Wiser et al. |
| 9,389,420 B2 * | 7/2016 | Maciocci ................ G06F 3/011 |
| 9,442,310 B2 * | 9/2016 | Biederman ............ G02C 7/083 |
| 9,547,374 B2 * | 1/2017 | Maciocci ................ G06F 3/011 |
| 9,996,151 B2 * | 6/2018 | Iwasaki .................. G06F 3/013 |
| 2004/0027536 A1 | 2/2004 | Blum et al. |
| 2006/0173497 A1 | 8/2006 | Mech |
| 2006/0227067 A1 * | 10/2006 | Iwasaki ................ G02B 27/017 345/8 |
| 2008/0208335 A1 | 8/2008 | Blum |
| 2010/0103368 A1 * | 4/2010 | Amirparviz ...... B29D 11/00826 351/158 |
| 2013/0335303 A1 * | 12/2013 | Maciocci ................ G06F 3/011 345/8 |
| 2014/0022505 A1 * | 1/2014 | Pugh .................... A61B 5/6821 351/159.03 |
| 2014/0240656 A1 * | 8/2014 | Pugh ...................... G02C 7/04 351/159.03 |
| 2014/0247210 A1 * | 9/2014 | Henderek ................ G06F 3/02 345/156 |
| 2015/0049004 A1 * | 2/2015 | Deering ............ G02B 27/0172 345/8 |
| 2015/0061990 A1 * | 3/2015 | Toner ...................... G06F 3/013 345/156 |
| 2015/0261294 A1 * | 9/2015 | Urbach .................. G06F 3/013 345/156 |
| 2015/0301338 A1 * | 10/2015 | Van Heugten ............ G02C 7/04 345/8 |
| 2016/0062150 A1 * | 3/2016 | Sako ...................... G02C 11/10 351/158 |
| 2016/0091737 A1 * | 3/2016 | Kim ...................... G02C 11/10 351/158 |
| 2016/0147301 A1 * | 5/2016 | Iwasaki .................. G06F 3/013 345/157 |
| 2016/0274671 A1 * | 9/2016 | Maciocci ................ G06F 3/011 |
| 2016/0299354 A1 * | 10/2016 | Shtukater ................ G02C 7/04 |
| 2017/0023793 A1 * | 1/2017 | Shtukater ........... G02B 27/0179 |
| 2017/0047051 A1 * | 2/2017 | Deering ............. G02B 27/0172 |
| 2017/0323481 A1 * | 11/2017 | Tran ...................... G06T 19/006 |
| 2017/0371184 A1 * | 12/2017 | Shtukater ................ G02C 11/10 |
| 2018/0074330 A1 * | 3/2018 | Callahan ................ G02C 11/10 |
| 2018/0173304 A1 * | 6/2018 | Lemoff ................ G03B 21/14 |
| 2018/0224669 A1 * | 8/2018 | Shtukater ................ G02C 7/04 |
| 2018/0275429 A1 * | 9/2018 | Pugh .................... A61F 2/1624 |
| 2018/0373058 A1 * | 12/2018 | Bostick .................. G02C 7/04 |
| 2019/0025609 A1 * | 1/2019 | Liao ...................... G02C 7/049 |

* cited by examiner

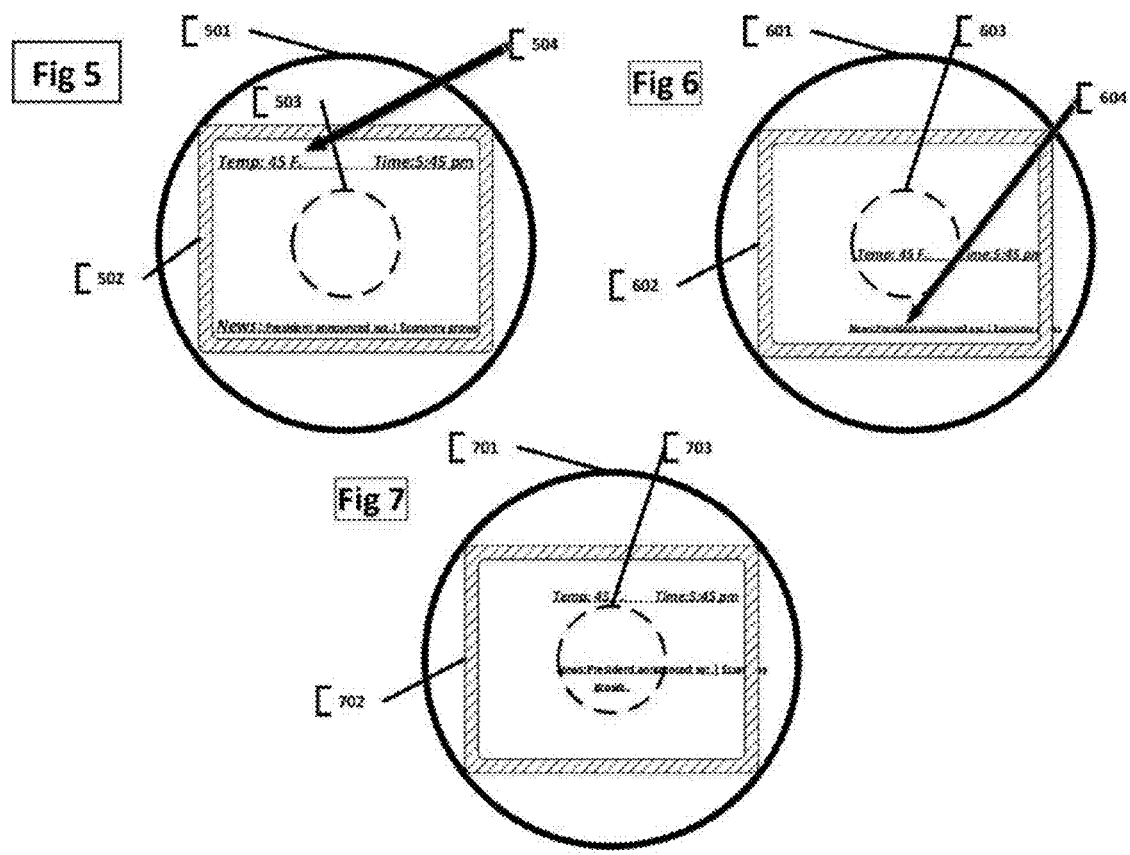

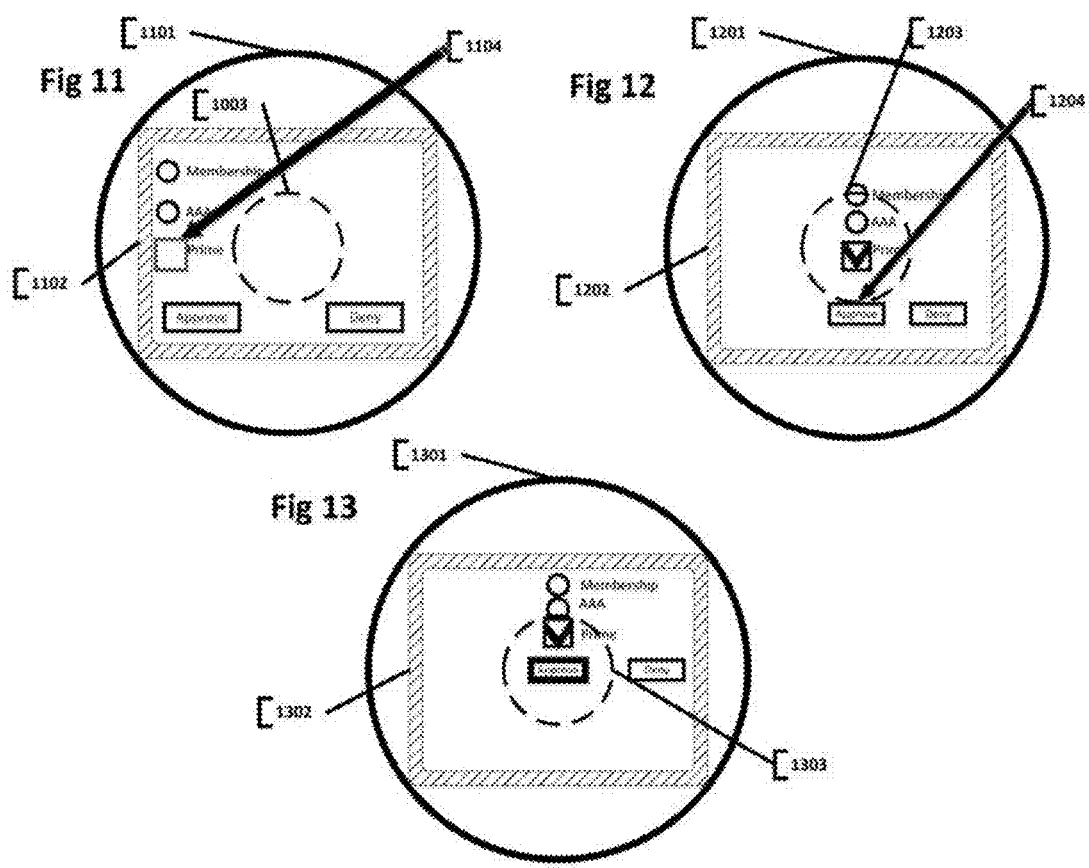

SMART CONTACT LENS WITH EYE DRIVEN CONTROL SYSTEM AND METHOD

CROSS REFERENCE TO RELATED APPLICATIONS

This application claims the benefit of U.S. Non Provisional patent application Ser. No. 15/071,205 filed on Mar. 16, 2016, the entire contents of which are incorporated herein by reference. Related U.S. patent application Ser. No. 14/963,241 filed on Dec. 9, 2015, Ser. No. 14/803,022 filed on Jul. 17, 2015, Ser. No. 15/268,582 filed on Sep. 17, 2016.

TECHNICAL FIELD OF INVENTION

The invention relates to Smart Contact Lens (SCL) System. More specifically, the invention relates to a system and process for generating a variety of display outputs using the embedded display component of the smart contact lens system and a system and process of controlling the said smart contact lens based system utilizing information derived from eye of the lens' user.

BACKGROUND

Typically, in most computers, user interface (UI) component selection is done by dragging mouse icon across over to the UI component of interest and then clicking the mouse button, indicating that the selection is taking place. Alternatively, UI selection is performed with a touch pad and a finger or joystick of some kind or other methods, where physical action is performed and is translated into UI component selection.

In a computer with a touch screen, UI selection is haptic and is driven by a hand or finger touch, which is detectable by the touch screen. UI component is selected by touching it. Some systems use helper stylus devices which also fall into the haptic class of devices.

In many AR (Augmented Reality) or VR (Virtual Reality) head mounted solutions, selection of the projected UI components is performed by tracking hands of the user for example.

With currently emergent AR technologies, hand movement is tracked by variety of color or depth sensors and hand movement is used as a controlling mechanism to select UI component or to signal and trigger system action. With the orthodox AR and VR systems, gestures are used as system commands or interpreted by specific application in context of which UI selection is performed by way of an external bodily action. Such action is then correlated to 2D or 3D UI geometry where selector UI component (arrow/hand) corresponding to the selector moves over the UI component on the screen, triggering action signals to the system to select the UI component. That in turn triggers an event that is sent by the system to the system/application being selected. The application then receives the trigger signal and initiates an appropriate response action.

With the orthodox AR and VR systems, gestures may be used for selection without selector UI component (arrow/hand), simply by the correlating geometry of the selecting body part (hand or finger, etc.) with the 2D or 3D geometry of the UI interface in the given AR or VR system. As soon as focus of the of the gesture points to a specific component the component is selected.

In systems of smart contact lenses with an embedded display, UI components may be depicted on the contact lens embedded display. Providing ability to select UI component out of many and thereby triggering system action as a way for the user to interact with AR or VR enabled smart contact lens is critical to making smart contact lens useful and practical. However, there are certain physiological and anatomical limitations of the human ocular system that need to be accounted for.

Generally, human eye lets light reflected from an object to travel through a lens, there to hit retina that is a light sensitive surface located at the back of the human eye. The retina of the eye may generally be divided into several discreet sections that are differentiated by a level of their respective light sensitivities. For instance, the retina may be divided into a fovea and a peripheral area, wherein the peripheral area further includes a parafovea belt, circumscribing fovea, and a perifovea outer region further from the center of the peripheral area, circumscribing parafovea. Retina mostly consists of two types of photoreceptor cells: cones for daytime colored perception and rods for dim light and black-and-white vision. In human eye, there are approximately 7 million cones and in the range of 75 to 150 million rods. Fovea, which is at the center of the retina consists of mostly cones so allows for good quality colored vision. The fovea enables a clear, a sharply focused, and a colored vision, whereas the peripheral area is used for a low light vision, for detection of movements and for discerning between different colors and shapes.

A sharp vision is possible due to a foveal area which is situated at the bottom of the eye directly in front of the lens of the human eye. However, the foveal area represents only some degrees of visual angle that enables a person to see a very limited portion of the observed view in sharp focus. Further, a peripheral vision is critically important and plays a crucial role in visual perception. Brain registers and processes information that falls into the region of the foveal area as well as information from the peripheral area. Initial and partial visual data acquisition is performed via peripheral view and for full and detailed data acquisition, eye moves to bring information of interest into focus; that is to sense an image in focus with foveal area.

Normally, in conventional vision systems, whenever an image is displayed in front of the user, such as on TV, a tablet or any other head mounted displays, text on the paper, location of the view remains constant and only eyes gaze direction changes relative to a stationary part of the image on the display to focus on other portions of the display in order to have full image data ingestion.

However, provided, a transparent or a semi-transparent or a non-transparent display is embedded into the contact lens, an image or a video being superimposed onto the real world objects view, in front of the user, may be displayed. Such kind of an embedded display is naturally, spatially associated with and locked in, relative to a position of the human eye. Because the embedded display will be shifting with every movement of the eye, only a part of the image being present at the center of the embedded display, would be in sharp focus and a user will not be able to perceive other parts of the superimposed image in clear focus. Further, the human eye position adjustments will not enable the eye to see other parts of the image, in focus because the embedded display moves with the movement of the human eye and an image disposition on display, a priori, does not change.

Furthermore, information about real world objects present in front of the user is superimposed onto the embedded display in spatial respect to geometry of objects visible to the user. For instance, an Augmented Reality (AR) enabled application recognizes real world objects, determines contextual annotations/descriptions associated with the recognized real world objects and superimposes onto the embedded display, information related to the real world objects in such a way that the information is overlaid near or over the real world objects in the view. In such an application, the information which will be a virtual object that would appear stationary relative to specific surrounding environment of the user. In another exemplary embodiment, by application of a display integrated into contact lens, information may be superimposed on the display irrespective of the spatial position of objects in the view of an observer. For example, text (article, book, etc. . . . ), dashboard, with temperature, time, stock quotes, running news line and other information. This data is independent of what the user sees via the contact lens. In another exemplary, application of display integrated into the contact lens is Virtual Reality (VR), wherein the view presented to the user is semi-transparent or non transparent, creating virtual reality view. There is multitude of other applications of an embedded display and any use of contact lens based embedded display will present the same limitation as described above.

To overcome the aforementioned problem, image on the embedded display may be shown at a center position in order to make an entire image in focus. In order to display the entire image at the center position and in focus, the image needs to appear as being far away from a user. However, this approach presents a number of limitations, such as: 1) amount of information and image size displayed in focus at "far away" is minimal, and 2) there is no peripheral view available which further limits usefulness of such an approach.

SUMMARY

The solution propounded in the present invention is: 1) to partly or completely shift responsibility of bringing different parts of the image displayed into focus, from the eyes to the display. To be in focus, the section of an image must be situated in front of the retina of the eye, at the center of the display. The image has to shift on the display, so as to position the section of an image of interest, at the center of the display bringing it into the focus. 2) the smart contact lens system tracks the changes in the eye position and correlates it with the corresponding UI component that comes into focus as a result of an image shift on the display, thereby the system "selects" the UI component that shifts to the center of the display. The system may optionally mark UI component specifically to signify that it was selected. Consequently, the system may activate the component either immediately after UI component has been selected or after activation happens with an additional trigger action or event. Hence, control of the smart contact lens system or the application based on smart contact lens, is realized with the eyes alone or eyes and an additional trigger action.

UI component may represent an action or information. UI component may be composed of and be represented by at least one pixel on the embedded display. Particularly, UI components may comprise but not be limited to:
Input Controls: checkboxes, radio buttons, dropdown lists, list boxes, buttons, toggles, text fields, date field;
Navigational Components: breadcrumb, slider, search field, pagination, slider, tags, icons;
Informational Components: tooltips, icons, progress bar, notifications, message boxes, modal windows, any information superimposed over real world view or any information presented in a AR or VR application.

Generally, UI components may be subdivided into two classes with the following semantics: informational or event, command, action triggering semantics.

Some UI components may carry informational semantics, with no event, command, action trigger semantics.

Some UI components may carry event, command, action trigger semantics.

UI component may be application window.

UI components may comprise one pixel or multiple pixels.

UI component may carry certain semantics and may signify an action, for example start recording, take a picture, start application, any other action. There may be UI components that are given semantics by the application being executed.

UI component may be editable or non editable.

UI component may be selectable or non-selectable.

UI component may be any information or object or picture or sign superimposed over real word view in AR type of application.

UI component may be any combination of pixels, on embedded display, whose appearance can carry any semantic significance for the user in AR or VR or any other type of applications.

UI component may be any information or object in VR type of application.

UI component may be selectable or non-selectable.

UI components may have informational selectable or non-selectable semantics only without command carrying semantics. Informative, selectable UI component does not have to be activated as command/event/action trigger. It only needs to be selected, to provide the system with the requisite information. Non selectable, informative UI component provides information for the user. For example: non editable text or non-editable radio button or any non-editable information presented in any fashion. Selectable, informative component may provide information to the user and provide ability to edit and change the value of the information; for example: radio button or checkbox, editable textbox or any editable information presented in any fashion. Selectable, informative component may provide information from the user back to the system.

In one non-limiting, exemplary embodiment, the selection of UI component on the embedded display may be achieved in one step process, whereas selection of the UI component automatically activates it—creates a triggering event.

In one non-limiting, exemplary embodiment, the selection of UI component on embedded display may be achieved in two step process: first, mark component as selected, 2) in a separate step activate the marked UI component.

In one non-limiting, exemplary embodiment, the system determines or sets an anchor point, which is the position of the eye at a given time. Once the anchor point is determined, the tracking of eye movement begins and the extent of the movement is proportionately correlated to the image shift on the display and image shift is performed to bring new portion of the image into focus. Once the eye movement stops, the UI component, situated at the center of display, is the UI component of interest and is selected. In one non-limiting, exemplary embodiment, the system may use timer as the trigger for activation of UI control, for example the user keeps focused and is looking at the UI control for longer than a specified timeframe acting as a threshold to trigger activation. In current embodiment, the system times how long the user looks/focuses at UI component and once the predefined threshold is reached, signaling happens.

In one non-limiting, exemplary embodiment, activation may be triggered with a at least one blink of one or two eyes.

In one non-limiting, exemplary embodiment, once component is selected it may be activated; that is a signal or event may be sent to an application that owns the UI component and activation takes place.

In one non-limiting, exemplary embodiment, once component is selected it may be marked as "selected", for example, contour of the UI component may be highlighted in bold or in different color or some other means of marking may be performed.

In one non-limiting, exemplary embodiment, once component is selected, it may be activated with certain signal or trigger. For example, the system may time how long the selected UI component is selected, and after some threshold, the selected component may be activated.

In one non-limiting, exemplary embodiment, the selected component may require an action for activation, for example a blink of an eye or series of blinks or predefined signaling movement of the head or predefined movement of the hand or both hands, or some other signaling means.

In one non-limiting, exemplary embodiment, the activation of the selected component may be performed by means of sound, lets say clapping once hands.

In one non-limiting, exemplary embodiment, the system may comprise an eye position or direction tracking component to track extent of the eye movement.

In one non-limiting, exemplary embodiment, the system may comprise processing module, configured to correlate position of the eye with the image on the embedded display.

In one non-limiting, exemplary embodiment, the system may comprise processing module, designed to process selection and activation for corresponding UI components.

In one non-limiting, exemplary embodiment, the system may comprise processing component, arranged to process UI component associated activation.

In one non-limiting, exemplary embodiment, the system may comprise an embedded display, integrated into the contact lens substrate, wherein the display may be optionally coupled with focusing component to focus an image on the retina of the eye. The image is focused with variety of available solutions, for example by utilizing Fresnel micro lens or any other means.

In one non-limiting, exemplary embodiment, the eye position or direction tracking component may comprise at least one orientation sensor, arranged to determine directional orientation of the eye, and arranged to keep track of eye vector changes.

In one non-limiting, exemplary embodiment, the eye position or direction tracking component may comprise color image or depth sensor situated externally on head set or nose based component and may be configured to track the position of the eye.

In one non-limiting, exemplary embodiment, the eye position or direction tracking component may comprise embedded color image or depth sensor situated on the contact lens and configured to track the vector of the eye relative the environment.

In one non-limiting, exemplary embodiment, the system may comprise an integrated environment sensing module. Environment sensing module may be comprised of multiple types of sensors; embedded into contact lens or remote.

In one non-limiting, exemplary embodiment, the environment sensing module may be responsible for 3D mapping of the environment around the user and identifying objects in the vicinity of the user.

In one non-limiting, exemplary embodiment, the environment sensing module may be responsible for tracking hand gestures and hand commands of the user.

The environment sensing module may be comprised of the depth sensors, range finder sensors, lidar, color CMOS or CCD sensors or infrared sensors or variety of graphene sensors or other MEMS types of sensors.

In one non-limiting, exemplary embodiment, the environment sensing module may be integrated into the contact lens substrate.

In one non-limiting, exemplary embodiment, the environment sensing module may be off board and be situated near the eyes and be mounted on head mounted or nose mounted device.

In one non-limiting, exemplary embodiment, the eye position or direction tracking component may comprise at least one image sensor which is coupled with processor component, thus enabling images taken by an embedded image sensor being analyzed for the depth information. Image sensor may be color image sensor or depth image sensor. By tracking depth information, the system may determine orientation of the eye relative to the environment, utilizing for example SLAM (simultaneous localization and mapping) methodology.

In one non-limiting, exemplary embodiment, the image sensor may be miniaturized CMOS or, CCD sensors, nano graphyne based sensor or any variety of MEMS image sensors or any other miniaturized type of sensor.

An image sensor may be a depth sensor or range finder sensor, for example monochrome CMOS sensor optionally coupled with IR emitter.

Depth images may be used by the system to keep track of the 3D geometry around the user and determine the position of the eye relative to the external environment. Also, depth sensor will reflect the relative distance of the object to the user while the latter is looking (focusing) at the object.

In one non-limiting, exemplary embodiment, the eye position or direction tracking component may comprise at least one eye focus determination sensor which might comprise a rear facing sensor, arranged to determine level of convexity of or the level of circumference of the crystalline lens in the eye.

In one non-limiting, exemplary embodiment, the eye position or direction tracking component may comprise at least one eye focus and accommodation determination component which might comprise a rear facing sensor, arranged to detect changes in the shape of crystalline lens in the eye.

In one non-limiting, exemplary embodiment, the eye position or direction tracking component may comprise at least one eye focus and accommodation determination component which might comprise a rear facing sensor, arranged to detect ciliary muscle signals to determine changes in eye's focus.

In one non-limiting, exemplary embodiment, the eye position or direction tracking component may comprise at least one eye focus and accommodation determination component which may be configured to track refocus and accommodation, measuring and tracking pupillary response reflex and accommodation reflex and detecting and computing the refocus taking place.

In one non-limiting, exemplary embodiment, the system may comprise a power supply component that may further comprise an embedded into contact lens substrate components and have off contact lens components. For example, the system may comprise: off the lens FR radiator or light source and onboard integrated RF inducting antenna, inducing electric charge from RF radiation or miniaturized solar panel accordingly.

In one non-limiting, exemplary embodiment, the system may comprise a power supply component deriving power from RF antenna.

In one non-limiting, exemplary embodiment, power supply component may comprise either an onboard battery or capacitor or accumulator.

In one non-limiting, exemplary embodiment, power supply component may comprise an embedded solar power or any other means of electric power generation.

In one non-limiting, exemplary embodiment, power supply component may comprise an electrochemical power source, temperature power source, or a mechanically derived power source (e.g., MEMs system); for example Piezoelectric methods In one non-limiting, exemplary embodiment, the system may comprise a communication component, either in the form of an embedded RF antenna with corresponding externally based transceiver of RF broadcast or in the form of an embedded light source reader and light emitter with an externally based, near the eye (headset based or nose based) light transceiver.

In one non-limiting, exemplary embodiment, the smart contact lens system may comprise the processing module; that may be a variety of microprocessor, CPU, GPU, HPU, ALU, DSP or any other computational and processing mechanism. The processor may be implemented on any scale. The processing component may be implemented on a micro or nano scale. In one non-limiting, exemplary embodiment, processor may be onboard integrated into the contact lens component or maybe off board, remotely available processing component.

DESCRIPTION OF DRAWINGS

The features which are believed to be characteristic of the present disclosure, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this disclosure will now be described by way of example in association with the accompanying drawings in which:

FIGS. 2-7 are flow diagrams illustrating exemplary operation of the contact lens system, in accordance with an embodiment of the present disclosure;

FIGS. 11-13 are flow diagrams illustrating exemplary operation of the contact lens system, in accordance with an embodiment of the present disclosure;

DETAILED DESCRIPTION

Figure 1:
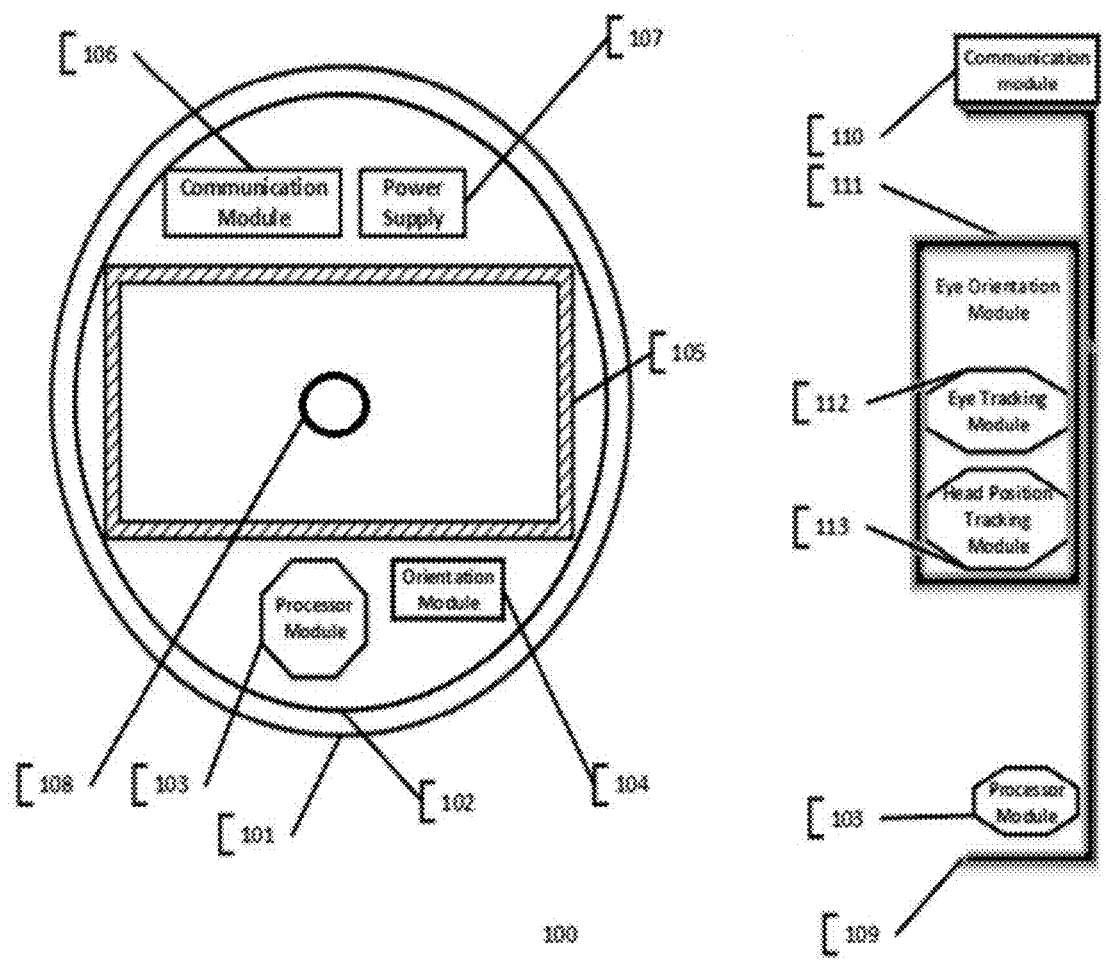
FIG. 1 illustrates a contact lens system with optional association with a head mounted device, in accordance with an embodiment of the present disclosure.

The terminology used in the present disclosure is for the purpose of describing exemplary embodiments and is not intended to be limiting. The terms "comprises," "comprising," "including," and "having," are inclusive and therefore specify the presence of stated features, operations, elements, and/or components, but do not exclude the presence other features, operations, elements, and/or components thereof. The method steps and processes described in the present disclosure are not to be construed as necessarily requiring their performance in the particular order illustrated, unless specifically identified as an order of performance.

In an event an element is referred to as being "on", "engaged to", "connected to" or "coupled to" another element, it may be directly on, engaged, connected or coupled to the other element, or intervening elements may be present. On the contrary, in an event an element is referred to as being "directly on," "directly engaged to", "directly connected to" or "directly coupled to" another element, there may be no intervening elements present. Other words used to describe the relationship between elements should be interpreted in a like fashion. Further, the term "and/or" includes any and all combinations of one or more of the associated listed items.

Although the terms first, second, third, etc. may be used herein to describe various elements, components, regions, and/or sections, these elements, components, regions, and/or sections should not be limited by these terms. These terms may be only used to distinguish one element, component, region, or section from another region, layer or section. Terms such as "first," "second," and other numerical terms when used herein do not imply a sequence or order unless clearly indicated by the context.

For the purpose of description of the present disclosure, the term "eye position" may be used interchangeably with one of the terms from: "eyes gaze orientation", "eyes orientation", "eyes direction", "eyes directional orientation", "eyes vector", or "gaze vector".

For the purposes of description of the present disclosure, the term "shift factor" may be used interchangeably with the terms "shift adjustment factor" and "display adjustment factor". The "shift factor" refers to the directional vector and extent of the shift of an image on the display.

For the purposes of description of the present disclosure, the term Frame of Reference (FoR) refers to an observer centric coordinate system. A 2D Frame of Reference refers to a two dimensional geometry of the embedded display and is defined by x and y axis, the 2D frame of reference is relative to the embedded display; a 3D Frame of Reference refers to real world three dimensional geometry and is defined by x, y and z axis.

For the purposes of the present disclosure, the terms "base reference" and "base point reference" and "zero point reference" and "anchor point" refer to the relative position of the eye and corresponding image disposition on display that can be deemed as the starting point for consequent eye gaze orientation tracking and corresponding image position adjustments on display.

In one non-limiting, exemplary embodiment, once the zero point reference is determined, tracking of the eye's position begins for the current image overlaid onto the display. With every shift in the eye's position, the image overlay may be recomputed accordingly so that the part of the image sought by the eye is displayed at the center of the display, in front of the eye's retina, and therefore displayed in focus.

In one non-limiting, exemplary embodiment, "base point reference" may be selected by the user with any detectable signal, with triggering action.

In one non-limiting, exemplary embodiment, the user may trigger taking base point reference by clapping his hands.

In one non-limiting, exemplary embodiment, the user may trigger taking base point reference by eye blink.

In one non-limiting, exemplary embodiment, the user may trigger taking base point reference by predefined signal that would be captured by image capture device and processed to identify the signal. For example certain sequence and form of hand gestures. In one non-limiting, exemplary embodiment, the user may trigger taking base point reference by predefined voice command.

By tracking changes in focus of the eye, the system may determine whether the eye is focused on the image superimposed on display or the real world objects in front of the eye.

In one non-limiting, exemplary embodiment, the user may trigger taking base point reference by tracking focus of the eye, in real-time, to determine whether the eye focusing on the objects at a distance or it is focused on the image on display. This method may be used to switch between Frame of References and for registering anchor point at the same time. In one non-limiting, exemplary embodiment, the system may correlate the object/UI components' disposition on the display and user's eye gaze vector as well as focus information to determine what is in focus at any given point in time. Based on this determination the system may perform variety of actions.

Variety of other detectors of a switch in gaze between outside real object and overlaid image are possible. Methods given above are exemplary only and should not be taken as being limiting to the scope of the invention.

In one non-limiting, exemplary embodiment, the system may predefine or dynamically determine where base point reference should be and when the tracking, against said point reference, should stop. The system may stop tracking position of the eye and correlate changes of eye's vector to the image disposition on display at stop point. Stop point may be signaled with hand gestures, voice or other signals. Stop signal may be signaled by change of focus from image on display to the real world objects in front of the user. There may be variety of other ways to identify or signal stop point. For 2D FoR, once the stop signal is identified, the image on display may return to its original disposition on display; regardless of the current position of the eye.

Referring to FIG. 1, a contact lens 100 of the present disclosure may comprise an active contact lens substrate 101 with an embedded display 105. The embedded display 105 may be arranged at the center of the contact lens substrate 101, so that the embedded display 105 may be positioned directly opposite to a cornea of a user's eye.

In an example, the embedded display 105 may be a transparent display, a semi-transparent display, or a non-transparent display. The embedded display 105 may be embedded within or on the contact lens substrate 101.

In an example, the embedded display 105 may have a round shape. Alternatively, the embedded display 105 may have a square shape. However, the shape of the embedded display is not limited to above mentioned shapes and the embedded display 105 may also possess other suitable shape.

In one non-limiting, exemplary embodiment, the embedded display 105 may be implemented as a variation of Liquid crystal display (LCD), or a Light Emitting Diode (LED) display. For example, GaN (Gallium Nitride) based LED. However, the embedded display 105 is not limited to the LCD or the LED or OLED display, and may also be implemented with variety of other micro or nano scaled light emitting components. The display may use passive or active display technology.

In one non-limiting, exemplary embodiment, the embedded display 105 may be comprise any type of active display technology.

In one non-limiting, exemplary embodiment, the embedded display 105 may be comprise any type of passive display technology.

In one non-limiting, exemplary embodiment, the embedded display 105 may be comprise any type of display technology.

Generally, the human eye cannot focus on an object which is closer than few centimeters from the eye. Regular display positioned immediately in front of the cornea of the eye does not allow the eye to perceive an image in clear and sharp focus due to natural, anatomical limitations of the human eye. This is a major difficulty implementing active contact lens with transparent, semi-transparent or non-transparent display built into the lens. There are several solutions to the problem at hand.

In an embodiment, the embedded display 105 component may comprise different types of microlenses. For example, a layer of an array of the micro lenses is positioned over the embedded display 105 in such a way that each of the micro lenses correspond to one or more pixels on the embedded display 105. The layer of the array of the microlenses is positioned facing directly a cornea of an eye. Micro lenses create collimated beam of light directly projected onto the retina of the eye. Rays of light, representing an image, are arranged collinearly or nearly collinearly and that leads to an image perceived by the perceiving subject as being far sourced and "being in focus". Some portions (off the center) of an image may be off focus and may be seen with peripheral vision.

In one non-limiting, exemplary embodiment, a display 105 may be coupled with a variation of the Fresnel like micro lenses or lens array that focuses an image directly onto the retina of the eye. The Fresnel lens is a diffractive focusing component that enables decent quality focus with a very thin optical component.

In one non-limiting, exemplary embodiment, a display 105 may be coupled with other types of focusing components.

In one non-limiting, exemplary embodiment, a display 105 may be implemented to produce light rays that are projected onto retina as images in focus.

In one non-limiting, exemplary embodiment, a contact lens system may utilize a single lens focusing entire display into the eye.

In one non-limiting, exemplary embodiment, a display 105 may be coupled with a variation of thin variable focus lens with a refractive index that may be changed electronically with an electric signal, such as a liquid crystal lens. Variety of other methods and technologies are possible for displaying information in focus at a close distance. This implementation may be especially useful for people with various ophthalmological focus problems.

It should be appreciated that there are variety of other strategies and techniques possible to produce projections of an image, onto retina of the eye, so that it is perceived as being in focus. Above mentioned methods are exemplary and in no way should be conceived of as being limiting the scope of the invention.

In an embodiment, the contact lens 100 of the present disclosure may further comprise an integrated power supply module 107. The power supply module 107 may provide electric power to the contact lens 100. The power supply module 107 may derive electric power from an energy transfer antenna 102. The energy transfer antenna 102 may receive power from a Radio Frequency (RF) power source that is located in proximity to the energy transfer antenna 102. The power supply module 107 may include a capacitor unit, a battery or an accumulator unit to supply electricity from a local storage when an external power delivery is not available.

In another embodiment, the power supply module 107 may derive electric power from an onboard, integrated solar panel, radio frequency power source, electrochemical power source, temperature power source, or a mechanically derived power source (e.g., MEMs system) or variety of piezoelectric components.

In another embodiment, the electric power may also be gained from several sensors that are integrated into the contact lens substrate 101. For example, an image capture sensor, which is reactive to light, may be configured to generate electricity in a passive mode. Further, heat sensors, conductivity, magnetic sensors and other electromechanical sensors may also be utilized. In an embodiment, the contact lens substrate 101 may incorporate an onboard integrated communication module 106. The communication module 106 may include a wireless antenna 102. The wireless antenna 102 may be arranged to communicate with an external communication transponder or to communicate with another "paired" contact lens. Communication module may be used for transmission of variety of other data or parameters or commands.

The communication module 106 may be used to a) request information from remotely available source, b) receive response from remotely available service providers, and c) get location information, instructions, and/or eye gaze direction from an off-board eye position tracking sub-system. In another embodiment, the communication module 106 may receive head directions from an off-board location determination sub-system that may be located remotely but in close vicinity of a user's contact lens. The communication module 106 may send to a server, image information collected by an image capturing device integrated into the contact lens substrate 101. In another embodiment, the communication module 106 may transmit/receive information from another contact lens being paired with the contact lens 100 of the present disclosure.

In an embodiment, the communication module 106 may comprise various electronic components, such as a transceiver coupled with a wireless antenna 102. The communication module 106 may include onboard memory and a sub-processor along with other miniaturized electronic components, such as micro or nano scaled electronics or MEMS based systems and other types of miniaturized electronics.

In an embodiment the contact lens 100 may comprise at least one processor module 103. In an embodiment, at least processor module 103 may also be included by a head mounted corpus 109. The processor module 103 of the head mounted corpus 109 may communicate with the contact lens 100 via a communication module 110 located within the contact lens and the communication module 106 located in the head mounted device.

In an embodiment, the processor module 103 may initiate request to be sent to an external server, via the communication module 106 and/or the communication module 110.

The processor module 103 may compute proper overlay of information onto the embedded display 105 in order to enable displaying the information at the center of the embedded display 105, thereby rendering relevant part of an image in focus.

In an embodiment, the processor module 103, may provide either hardware only or both hardware and software solutions to determine a Frame of Reference (FoR). The processor module 103 may track eye shifts and optionally head position shifts and may further compute proper disposition of an image on the embedded display 105.

In one non-limiting, exemplary embodiment, the processor module 103 may determine Frame of Reference (FoR) and may compute proper shift of an image on the embedded display 105 based on either two-dimensional FoR (shift only based on eye shift) or based on three-dimensional FoR. In the three-dimensional (3D) FoR head position as well as eye position are tracked and correlated with the 3D geometry around the user. Based on the tracked positions, a location on the display of an overlaid image is computed in order to bring the image in focus.

In one non-limiting, exemplary embodiment, for both 2D FoR and 3D FoR the direction of eye's gaze may be determined based on eye orientation module.

In one non-limiting, exemplary embodiment, for both 2D FoR and 3D FoR the direction of eye's gaze may be determined based on environment sensing module. Where environment sensing module is responsible for mapping environment of the user with variety of sensors and techniques; environment sensing module may determine the orientation of the eyes against mapped environment.

In one non-limiting, exemplary embodiment, the environment sensing module may utilize SLAM (simultaneous localization and mapping) methodology to map the environment of the user and to determine the orientation of the user relative to the environment. In one non-limiting, exemplary embodiment, environment sensing module may comprise an onboard, embedded into the contact lens substrate, environment sensing component.

In one non-limiting, exemplary embodiment, environment sensing module may comprise an off board environment sensing component located near eyes.

In one non-limiting, exemplary embodiment, environment sensing module may comprise variety of lidar, rangefinder, radar, color or depth sensors and variety of other methods and sensors enabling to determine and map the environment of the user. In one non-limiting, exemplary embodiment, environment sensing module may be implemented as a variation of MEMS, with micro or nano scale electronic components.

In one non-limiting, exemplary embodiment, environment sensing module may be used to track user's gestures and bodily movement.

In one non-limiting, exemplary embodiment, environment sensing module may be used to track movement of objects in the vicinity of the user.

In one non-limiting, exemplary embodiment, 2D FoR, the processor module 103 may take a number of inputs, from a variable number of sources, for example, the inputs may be:
  current directional orientation of an eye of a user or delta in orientation relative to previous value or both, received from an integrated onboard orientation module 104 or from an external eye orientation module 111 or eye tracking module 112 or environment tracking module, where orientation of the eye is determined relative and against the environment;

current image disposition on the embedded display 105; or an image handle;

an information identifying anchor point

Further the processor module 103 may compute a shift factor; based on which an image is shifted on the embedded display 105. In order to determine shift factor in 2D FoR, change in the eye's gaze direction and an extent of the change is computed. The processor module 103 may apply the shift factor to the image to compute image disposition on the display. In an embodiment, matrices manipulation may be used to compute disposition of the image on display; any other method may be used to compute disposition of the image on display. However, other methods of computation are possible, for example algebraic equations may be used and other methods. Consequently, the image is displayed with new computed disposition.

Furthermore, extent of the shift depends on and correlates with the level of eye's movement in certain proportion. The correlation between eye movement and corresponding extent of an image disposition shift may be preconfigured in the contact lens system or may be dynamically determined and adjusted based by variety of factors. For example, user of the contact lens may calibrate his preferred level of correlation at the beginning of use of the contact lens system, the correlation may be configured at the time of use of the contact lens with variety of gestures preconfigured to control contact lens system. The system may use other dynamic factors to adjust correlation.

In one non-limiting, exemplary embodiment, shift factor may be computed relative to the base point reference or relative to certain predefined or preconfigured or dynamically determined coordinate orientation.

It should be understood that the description of the method of the shift of image disposition on display is provided here by way of example and in no way should be thought of as limiting to the scope of the invention. The term of "shift factor" as described in present disclosure is used by way of an example, to demonstrate how image disposition on display may be computed; the description provided here is by way of example and should not be taken to be limiting to the scope of the invention; other terms and methodologies may be used to describe the similar function.

In one non-limiting, exemplary embodiment, in 3D FoR, the processor module 103 may take a number of inputs, from a variable number of sources, for example, the inputs may be:

current directional orientation of the eye or delta in orientation relative to previous value or both, received from the integrated onboard orientation module 104 or from the external orientation module 112. In an event, the orientation module 104 tracks orientation of the eye in 3D, then there is no additional head tracking is required. Otherwise, in order to determine actual orientation of the eye in 3D, a 3D measuring orientation sensor is implemented; directional orientation of the user's eyes may be derived from environment sensing module. Where environment sensing module may determine orientation of the eyes relative to the mapped environment of the user.

optionally, current directional orientation of the head or delta in directional orientation of the head, received from a head tracking module 113. In an event, the orientation module 103 and the external orientation module 112 track only 2D orientation of the eye, an additional head position tracking is required in order to provide absolute shift of eye gaze vector relative to a 3D geometry;

current image disposition on the embedded display 105; and an image handle.

information identifying anchor point.

In order to determine the shift factor in 3D FoR, 3D geometry around the user and change in eye gaze position relative to 3D geometry are tracked. The shift factor is applied to an image to compute an image disposition on the embedded display 105. In an embodiment, matrices manipulation is one of the most optimal ways to compute the disposition of the image on the embedded display 105. However, other methods of computation may be used. Further, the image is superimposed on display at new computed disposition.

In one non-limiting, exemplary embodiment, for an active process of calculating the shift factor, embedded display 105 calibration parameters, resolution of the embedded display 105, optical strength of the Fresnel like lens, size of an image and/or other optical parameters of the embedded display 105 are considered.

In one non-limiting, exemplary embodiment, a passive process may respond to users trigger action and may perform shifting of the image on the embedded display 105 without having user repositioning his/her eyes.

In one non-limiting, exemplary embodiment, processor module 103, is configured to identify and process UI component selection and UI component activation. Processor module 103 tracks multiple variables to determine whether to select the UI component of interest and weather to activate it.

Processor module 103 may comprise a processor which may be a general purpose processor (CPU) or a processing unit capable of processing computer instructions. The processor module 103 may further include operating RAM memory, ROM memory, EPROM memory, EEPROM or DROM memory, and non-volatile RAM (NVRAM) memory, or any other kind of operating memory. In one embodiment, the processor module 103 may also include permanent memory. In an embodiment, the processor module 103 may include miniaturized Micro-Electro-Mechanical Systems (MEMS) based or nano scaled sub-systems. Processor may be an onboard, embedded into the contact lens substrate unit or alternatively may be remotely available. Processor may be integrated into glasses or headset of the user for example.

In one non-limiting, exemplary embodiment, the processor module 103 may be built with carbon nanotube based crossbar memory, for example Nano-RAM or memristor technology. Alternatively, any other memory device based on spintronics principle may also be utilized for building the memory. In another example, MRAM based on GMR and TMR effects may be utilized for constructing the memory. Memory construction is not limited to aforementioned technologies and any other technologies, such as micro or nono-electronics components, may be used. Any other processing technology of any scale may be utilized, both onboard or off board.

The processor module 103 may communicate with contact lens and remotely available services. The processor module 103 may output visual information to the embedded display device 105 and audio information to audio output device. Image data coupled with audio signal provides a better augmented reality experience.

The processor module 103 may be integrated with the contact lens 100 or may be an external sibling device that has wireless connectivity to the contact lens 100. The system may combine the two processors, playing similar or different roles in the system, where first processor is integrated into the contact lens 100 and the second processor is situated remotely on a sibling device external to the contact lens 100.

It should be understood that the structural and functional description of the processor module 103 or other electronic components of the system provided here are exemplary and illustrative and should not be conceived as being limiting to the scope of the invention. Any miniaturized information processing component(s) may be utilized for the processing module 103.

In one non-limiting, exemplary embodiment, the active contact lens 100 may be equipped with an onboard eye orientation module 104. Eye orientation module 104 may be used to determine directional orientation of the eye. Eye position changes relative to constant position of the head. The eye position may be measured in two dimensions, according to 2D FoR.

In one non-limiting, exemplary embodiment, the active contact lens 100 may be equipped with an onboard eye orientation module 104. The eye orientation module 104 may track gaze direction in 3D that combines direction of the eye and the head. The gaze direction is measured in three dimensions, according to 3D FoR.

Further, the smart contact lens 100 may comprise an embedded directional orientation sensor module 104. The direction orientation sensors may include compass, gyroscope, tilt sensor and accelerator or any other sensor capable of determining directional orientation or capable of tracking changes in directional orientation. The direction orientation sensor module 104 may include Inertial Measurement Unit (IMU) or Attitude Heading Reference System (AHRS). Sensors may be implemented with Micro-Electro-Mechanical Systems (MEMS) technology. Furthermore, sensors may be implemented as nono or micro scaled sensors.

In one non-limiting, exemplary embodiment, the direction orientation sensor module 104 may contain multi-dimensional gyroscope, tilt sensor and/or optionally accelerator. Such orientation sensor module 104 may accurately determine and track the direction of the eye's gaze in two dimensions; measurements of the direction of the eye's gaze may be made relative to the base point reference in 2D FoR of the image superimposed. In one embodiment, head movement is disregarded completely and only eye movement is considered for the measurement of direction of the eye's gaze. Here, the focus is on the image superimposed onto the display, for example, text image. With every move of the eye text image is redrawn so that next appropriate portion of text image comes into focus.

In one non-limiting, exemplary embodiment, the eye orientation sensor module 104 may contain combination of compass, multi-dimensional gyroscope, tilt sensor and optionally accelerator. Such eye orientation sensor module 104 may accurately determine and track the direction of the eye's gaze in three dimensions; measurements of the direction of the eye's gaze may be made relative to the base point reference in 3D FoR of the image superimposed. In one example, both eye movement and head movement are considered for measuring the direction of the eye's gaze. Annotations of the objects in front of the user may be superimposed onto objects being looked at and position of the annotation information on the screen is being recomputed to bring parts of the image into focus.

In one non-limiting, exemplary embodiment, the eye orientation module 104 may be remotely available and may be embedded into a paired sibling device such as wearable glasses. Such remote eye orientation module 104 may observe eye movements and measure the extent and direction of eye moves.

In one non-limiting, exemplary embodiment, the system 100 may include an orientation module 111 installed on a head mounting corpus 109. In the present embodiment, the orientation module 111 may be equipped with an eye position tracking module 112 and head position tracking module 113.

In one non-limiting, exemplary embodiment, the eye position tracking module 112 may be comprise at least one image capture device. Further, the position tracking module 112 may optionally include a light emitter, for example a Infra Red (IR) emitter. The eye position tracking module 112 may include the processing unit that analyzes sequence of images, recognizes position of the iris/pupil of the eye and tracks the changes in the eye's position.

It should be understood that there are various techniques and methods available for tracking eye position. Above described is illustrative in nature and should not be conceived to be limiting to the scope of the invention.

In one non-limiting, exemplary embodiment, the eye position tracking module 112 may be used for managing position of superimposed image in 2D FoR relative to a base reference point. In the present embodiment, head position is not considered and only eye position is considered for managing position of the superimposed image.

In one non-limiting, exemplary embodiment, remote or head mounted orientation module 111 may comprise head position tracking module 113. Head mounted orientation module 111 may comprise compass, gyroscope, accelerator or other direction/orientation sensing components.

In one non-limiting, exemplary embodiment, combination of the eye position tracking module 112 and the head position tracking module 113 may be used for managing position of superimposed image in 3D FoR relative to the base reference point. In the present embodiment, both head position as well as position of the eye are considered while computing shift in the image position on the display.

In one non-limiting, exemplary embodiment, the system may track outward geometry with environment sensing module that comprises either image capture or depth capture or any other environment sensing device/sensor(s). Eye position change in 3D FoR may be determined by correlating change in depth images with, for example, SIFT (Scale Invariant Feature Transform) to identify the head direction change in as well as eye movement within the same time window. The environment sensing depth image capture device may be integrated into the contact lens or may be situated on the head mounted device. If the depth capture device is onboard of contact the lens, then SIFT can determine absolute orientation change in 3D without considering head position changes.

It should be noted that either of the integrated contact lens orientation module or the head mounted orientation module may be used in isolation or together to achieve the objective. Either orientation module or environment sensing module or eye tracking module may be used to determine and track eye's gaze orientation. Any other devices or methods may be used to determine the orientational vector of the eyes.

In one non-limiting, exemplary embodiment, the active contact lens 100 may be arranged with one or more RF antennas 102. RF antennas may be used by communication module 106 for sending and receiving data. RF antenna may also be used by the power supply module to generate electric energy wirelessly.

In one non-limiting, exemplary embodiment, the active contact lens 100 may be arranged with a solar panel to generate electric energy.

In one non-limiting, exemplary embodiment, the active contact lens 100 may be arranged with Piezoelectric generator.

In one non-limiting, exemplary embodiment, the active contact lens 100 may be arranged with other varieties of electricity generating or gathering components.

In one non-limiting, exemplary embodiment, the active contact lens 100 may be arranged with capacitor, battery, accumulator and other variety of electric energy storage systems.

In FIG. 1, section 108 depicts area on the embedded display where data may be in clear focus. This area of display is the target area for refocus based on eye's and optionally head's movements.

In one non-limiting, exemplary embodiment, the processor module 103, may be configured to "select" UI component that was brought to the center of the contact lens.

In one non-limiting, exemplary embodiment, the processor module 103, may be configured to select by marking the UI component as "selected" by for example making UI component appear in bold or making it bigger. Any kind of visual mark may be used to differentiate between currently selected UI component and any other UI component on embedded display.

In one non-limiting, exemplary embodiment, a previously selected UI component may be deselected at the same time when the selection of another UI component occurs.

In one non-limiting, exemplary embodiment, the processor module 103, may be configured to actuate (activate) UI component selected immediately after its selection.

In one non-limiting, exemplary embodiment, the processor module 103, may be configured to actuate (activate) UI component after the selection took place with a timer; the system may define timeframe threshold, for example, two seconds of focus held by the eye on the control and thus activates it.

In one non-limiting, exemplary embodiment, the processor module 103, may be configured to actuate (activate) UI component, based on some triggering action, including but not limited to blinking of the eye, clapping hands, hand(s) movement, or any physical bodily action or voice command.

In one non-limiting, exemplary embodiment, the system may be configured to process blink of right eye and blink of left eye differently by giving them different semantics. Similarly to computer processing mouse right click versus mouse left click.

In one non-limiting, exemplary embodiment, the smart contact lens system, may be configured to actuate (activate) UI component, based on activation signal from Brain-Computer Interface (BCI) also known as Brain-Machine Interface (BMI).

Figure 2:
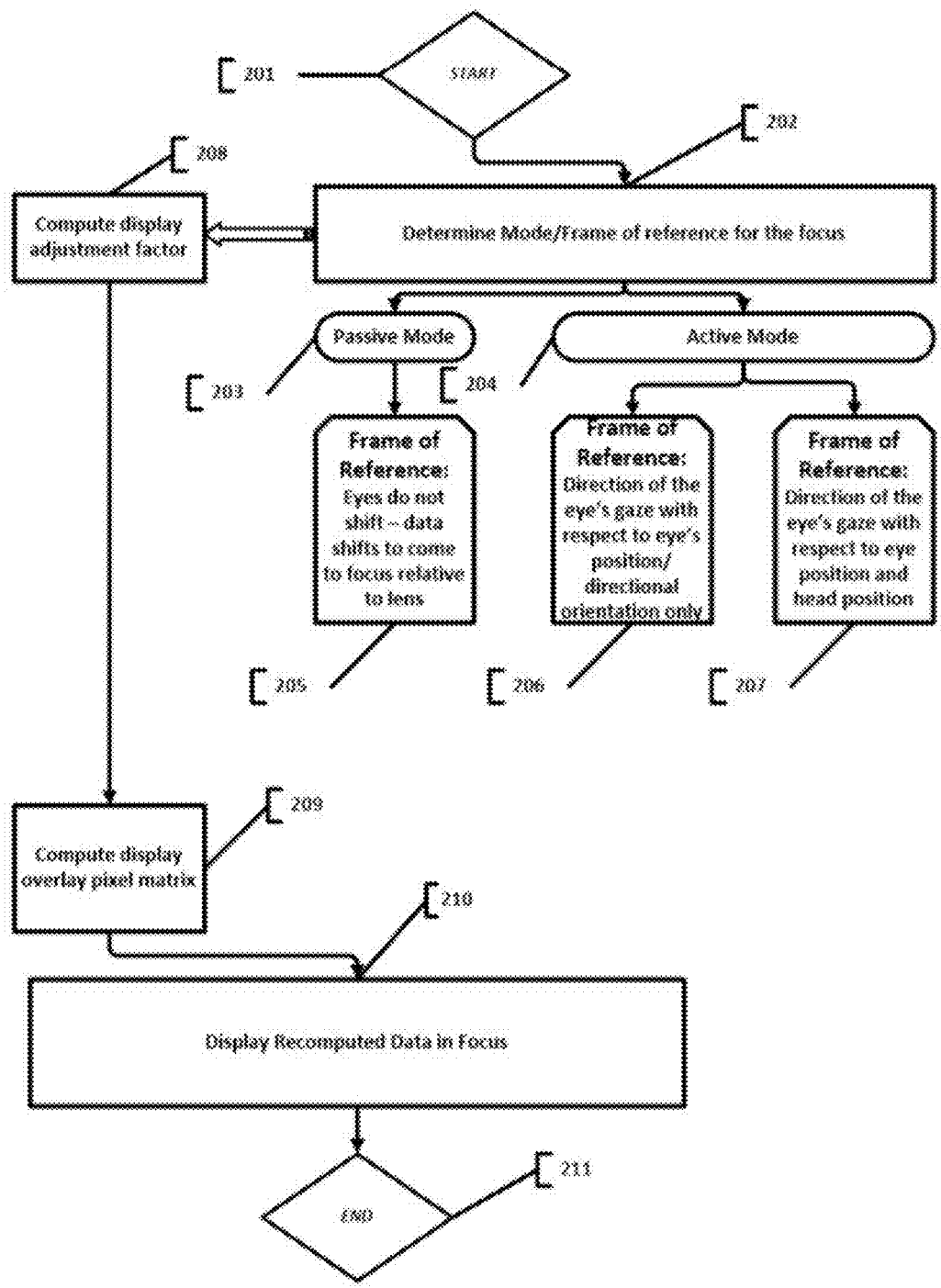

In FIG. 2, a one possible process flow of proposed system is depicted. The process detects the need of transition from one FoR to another and switches the system accordingly to an alternative mode of operation. The process starts at step 201 with, for example, turning the contact lenses to an 'ON' state. At step 202, a mode of operation of the system is determined. At step 202, optionally, a user may switch the system into one of the modes, otherwise the system may auto-detect the required mode and switch to that mode or the system may trigger default setting to attain an initial pre-configured mode. Possible modes are: passive mode 203 (eye does not move—image moves 205) and active mode 204—image shift on the display is computed proportionally to either eye direction change or head position change or both depending on Frame Of Reference and base point reference. The process loops at step 202, constantly monitoring and determining the mode of operation the system is in. The process may change the mode (Frame Of Reference) at step 202. Various methods may be utilized to switch between the 2D FoR or 3D FoR. For example, eye's focus may be monitored, with various techniques, namely change in crystalline lens shape may indicate change in focus.

In one non-limiting, exemplary embodiment, focus change may be detected and tracked by tracking an activity of the ciliary muscle. At least one electromyography sensor, embedded into the contact lens substrate, configured to detect an electric field in a ciliary muscle of the eye that is proportional to a force exerted by the ciliary muscle while changing the shape of the crystalline lens. Ciliary muscle exertion leads to a change in the shape of crystalline lens of the eye and therefore changes in focus of the eye.

In one non-limiting, exemplary embodiment, focus change may be identified with variation of an embedded piezoelectric sensor. Piezoelectric sensor is configured to detect and track electric signals/fields engendered by activity of ciliary muscle. Strength of electric signal is indicative of the level of muscle exertion.

In one non-limiting, exemplary embodiment, once change of focus is determined it may be optionally correlated to and juxtaposed against the "expected" focus of the eye based on how far the objects in front of the eye are. Expected focus may be determined by using depth sensor or range finder or Lidar or analysis of the color image sensor output. For example, the system may determine the distance to an object in front if the eye by correlating several images taken by the image sensor. Variety of techniques are available to build 3D Model of reality from either of the sensors.

Whenever, the focus change does not correspond to the distance to the objects being looked at in reality the system can deduce that the focus is on overlaid image. That is assuming the image overplayed is shown at different focal point then the objects in front of the user. And vice versa, the change of focus from an image on display to the "expected" focus is similarly detectable.

In one non-limiting, exemplary embodiment, change of focus may be detected by tracking accommodation reflex and correlating it to the expected focus; by correlating it against the 3D model of reality around the user.

In one non-limiting, exemplary embodiment, optionally the system may also, monitor and track pupillary response reflex. The system may track amount of light entering the eye with, lets say with luminescence sensor. The system consequently may compute the extent of pupil dilation and correlate it to the pupillary response for current expected distance. If the two do not correspond then the user is focusing on an overloaded image on the display with a different focal point.

In one non-limiting, exemplary embodiment, accommodation may be detected with variety of capacitance sensors.

It should be understood that any other focus detection and tracking method may be used. Methods and techniques provided in present patent disclosure are exemplary only and should not be taken to be limiting to the scope of the invention.

In one non-limiting, exemplary embodiment, predefined hand gestures or sounds or an eye blink or sharp movement of the eye to the side or to up or down, other signaling techniques may signal and trigger switch to another mode.

The predefined hand gestures or sounds or other signaling techniques may signal and trigger shift of an image on display to bring parts of an image of interest into focus. These signals may be used to determine the direction and extent of the shift of the image on display.

In one non-limiting, exemplary embodiment, interest in or intent of switching from looking at real world objects to looking at superimposed image information may be identified by monitoring brain activity and brain state with variety of methods measuring brain activity and state, for example, using invasive or non-invasive BMI (Brain Computer Interface).

Noninvasive computer interface may for example comprise head-mounted device arranged to monitor and measure certain brain waves, called alpha waves, with electroencephalogram (EEG) apparatus. Such an apparatus may be used to detect variety of brain activity, volition, voluntary intentions or visual stimuli. Such a device may track, filter and detect the intention to change focus and focus on the superimposed image or vise-versa, flip from focus on superimposed image to the view in front of the user. Furthermore, such BMI device may be used to also determine the extent of the shift and direction of the shift of an image required.

In one embodiment, BMI may be used to flip flop between 2D FoR and 3D FoR as well as take zero reference point and control and manage the shift of an image on display to bring an image into focus.

Active mode may be implemented based on 2D FoR represented by change of orientation of the eye (direction of the eye) 206. Alternatively, active mode may be implemented based on 3D FoR represented by both change of orientation of the eye and head 207. For 3D FoR, the system may utilize on absolute orientation information derived from, and embedded into contact lens, 3D orientation module. Alternatively, the system may utilize a combination of relative orientation of the eye information and head movement tracking information. Alternatively, the system may utilize a environment sensing module to reverse compute the orientation relative to the current environment of the user.

At step 208, display adjustment factor (shift factor) is computed based on several factors, such as display parameters and focusing component (Fresnel lens) parameters, in an active mode, first position of the eye and last position of the eye, computed relative to 2D FoR (eye shift only) or 3D FoR (accounting for head position change), delta in position of the eye may be computed as vector value to indicate both angular shift and extent of the shift. For passive mode, the adjustment factor may be computed based on the predefined shift parameters or dynamically set shift parameter; shift parameter may postulate speed and/or interval of shift of an image on the display. For active mode, the shift may be computed for the delta in the eye's or head's position or based on the change of eye's gaze orientation relative to the environment of the lens wearer.

Subsequently, position of an image on display is computed at step 209. Here, per pixel image matrix is computed and consequently image is superimposed onto the display at step 210. Step 211 signifies an end of the process, for example step 211, the device may now be turned to an "OFF" state. The process works in a loop wherein with every change in eye's position, recompilation of image's disposition on display follows. Consequently, recomputed pixel values are updated on the embedded display.

Figure 3:
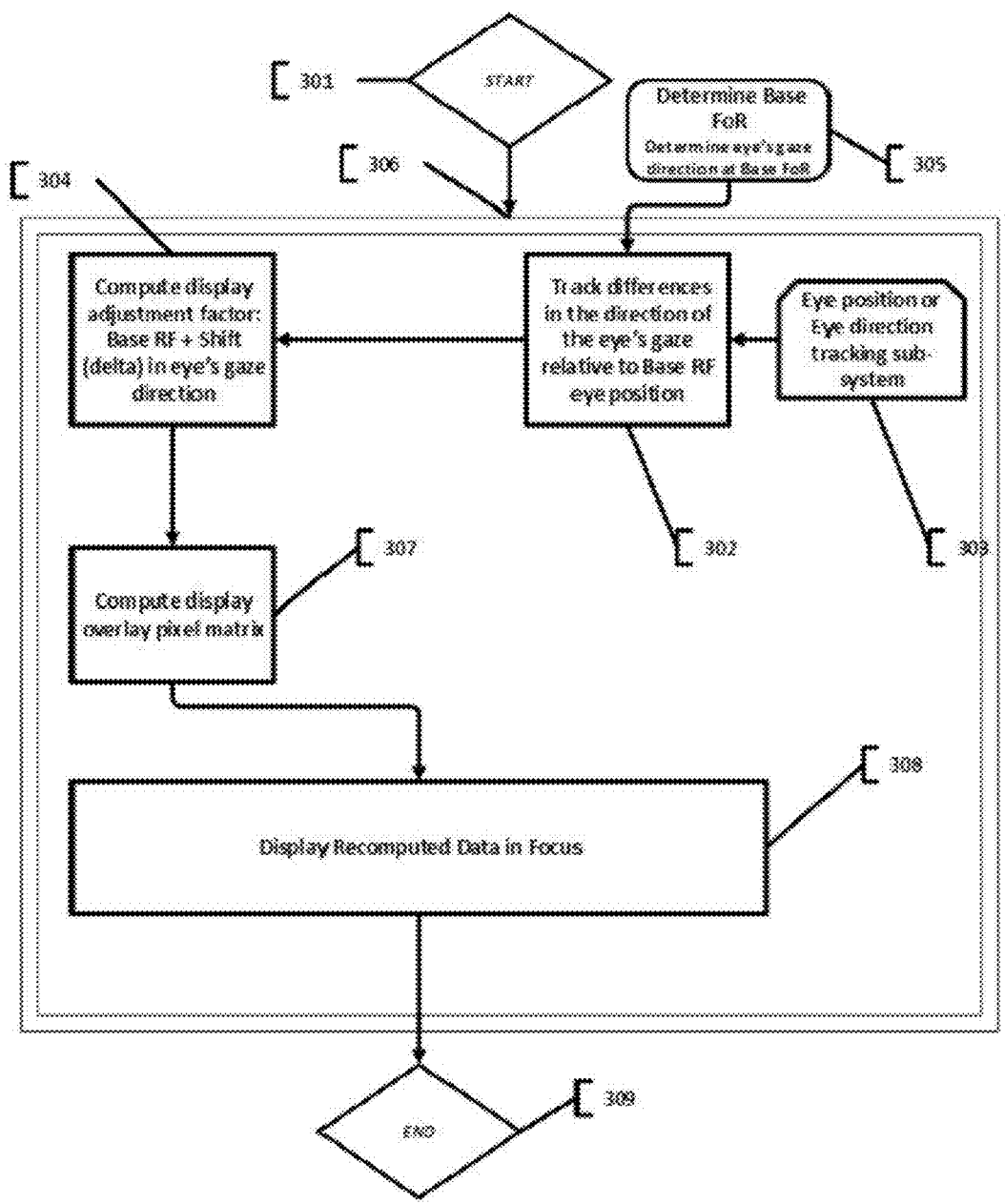

FIG. 3 depicts a detailed flow diagram for the 2D FoR variation of the active mode process. The process starts at step 301, for example, by turning the contact lens system to an "ON" state. At step 305, base reference is determined and used as the starting position to determine the eye's gaze shift at step 302. At step 303, the directional change in the eye's position is determined.

In one non-limiting, exemplary embodiment, directional orientation of the eye may be determined and tracked with an orientation module.

In one non-limiting, exemplary embodiment, directional orientation of the eye may be determined and tracked with external tool observing eye position.

In one non-limiting, exemplary embodiment, directional orientation of the eye may be determined and tracked with environment sensing module which maps the environment, optionally builds 3D map of the environment; such environment sensing module may correlate current relative position relative to the mapped 3D map of environment and hence derive the directional orientation of the eye.

At step 304, the system computes shift adjustment factor based on base reference and delta in the eye's direction relative to the base reference point. Shift adjustment factor may be represented as vector value indicating angle and extent of the shift required in the disposition of an image. Shift adjustment factor may be represented as an angle measure and value measure, whereas angle indicates angle (direction) of the shift and value measure indicates extent of the shift in the direction of the angle. It should be understood that shift factor, also known as shift adjustment factor may be expressed in variety of ways and given here suggestions are for illustration only and in no way are limiting to the scope of the invention. Furthermore, at step 307 the system computes per pixel image matrix based on the shift adjustment factor. There are variety of ways the computation may be achieved, for example with matrix mathematics, trigonometric models and so on. Further, the computed image is output to the display at step 308, so that sought part of image is displayed at the center and is situated at the center of the eye, against eye's retina and thus new portion of an image comes into focus. At the same time, the portion of the image that has been in focus previously shifts to the peripheral zone of the display. This process is repeated in a loop 306. Step 309 signifies end of the process and may be triggered, for example by user command, by switching to another Frame of Reference. Step 309 may be triggered by an eye changing focus from the overlaid image to the outside view.

It should be understood that the above described process flow is provided here in the way of an example and is not limiting to the scope of the invention. There are many ways to implement computation of the image position on display for example, some of which are not described herein.

Figure 4:
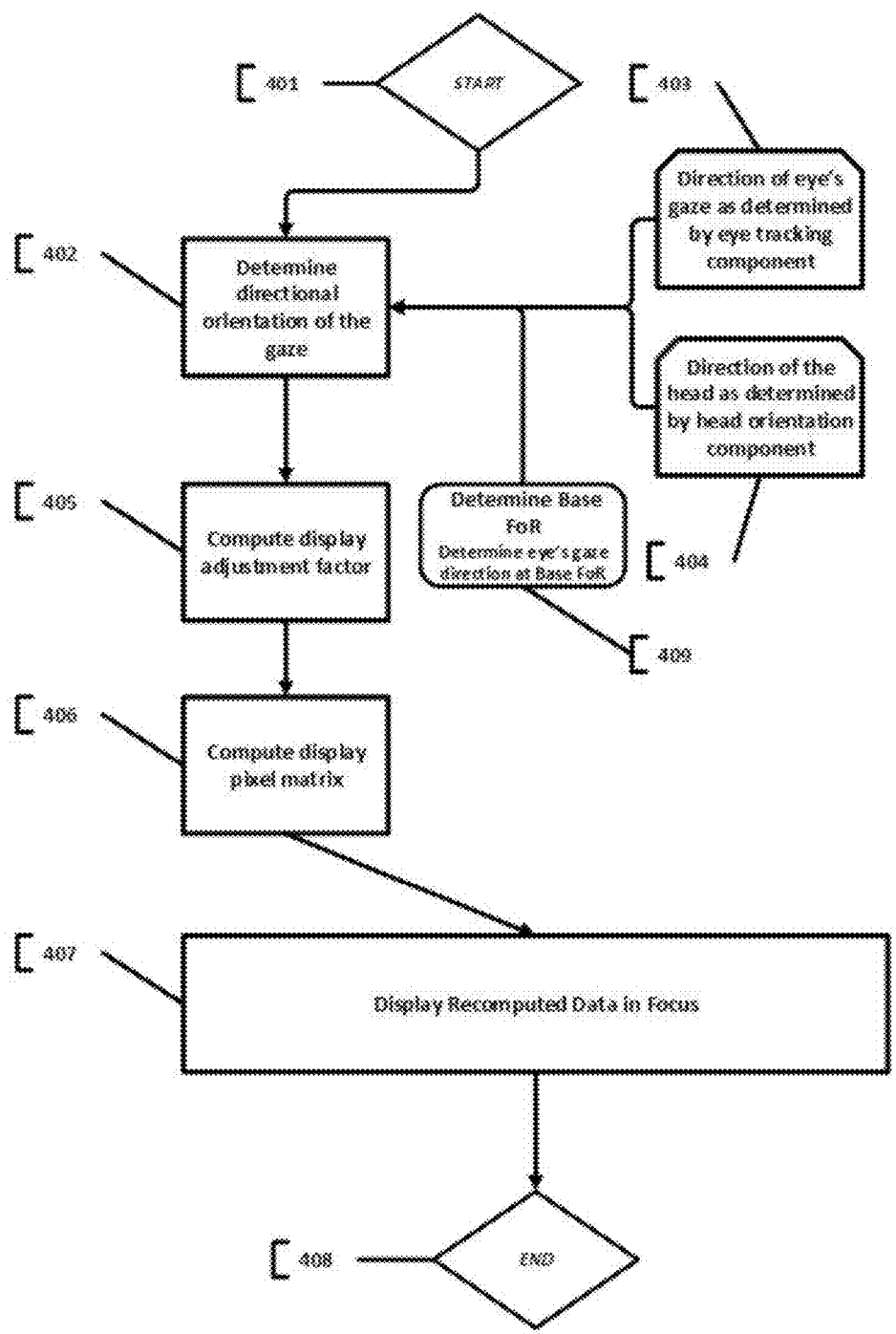

FIG. 4 depicts a detailed flow diagram for the 3D FoR variation of the active mode process. The process starts at 401, for example, by turning the contact lens system to an "ON" state. At step 409, base reference is determined to be 3D FoR.

Furthermore at step 403 eye gaze direction is determined. At step 404, direction of the head is determined. Steps 403 and 404 may be combined and direction of the eyes' gaze may be determined by the embedded into the contact lens orientation module. Whereas, orientation module may determine absolute or relative direction of the eye's directional vector. The measurement may be expressed in various ways, for example, as linear vector, rotation matrices, Euler angles, trigonometric angle measure or any other mathematical construct. At step 402, directional orientation of gaze is determined, relative to 3D FoR.

Furthermore, at step 405, display adjustment factor is computed based on combined delta in the head and eye's gaze direction relative to the base reference position.

In one non-limiting, exemplary embodiment the display adjustment factor is computed based on the measurements from any combination of orientation determination and gaze tracking mechanisms.

In one non-limiting, exemplary embodiment the display adjustment factor is computed based on the difference in estimated direction of the eye.

In one non-limiting, exemplary embodiment, estimation of direction is performed by analyzing color or depth images taken by image or depth capture sensors integrated into the contact lens or externally situated sensors.

In one non-limiting, exemplary embodiment various integrated range finders may be used to estimate depth/distance. Estimation of eye gaze direction may be performed by utilizing Similarity Invariant Descriptors (SID), for example, Scale-Invariant Feature Transform (SIFT) or Gradient Location and Orientation Histogram (GLOH) algorithms. These algorithms may be applied to juxtapose and correlate the two images that are taken at different times, to detect differences and to compute gaze direction and change of the gaze overtime.

Orientation module or environment sensing module may be used either in isolation or jointly to determine shift adjustment factor.

Further at step 406, compute per pixel display matrix, so that image shift is reflective of the shift in the eye's position. Computation of the latest display matrix may be carried out by the system's processing module; processing module may be integrated into the contact lenses or alternatively may be disposed on a remote device. At step 407, refresh screen and display recomputed image so that sought portion of an image comes into focus at the center of the display. This process may be executed in a loop. The process stops at step 408 with either predefined user triggered action or refocus or switch to another Frame of Reference or any with some other signal.

In one non-limiting, exemplary embodiment the display adjustment factor is computed and actual display gets redrawn in real time with every change in the eye position or every change in data displayed during eye tracking phase.

FIG. 5, FIG. 6 and FIG. 7 show sequential "walk" of the eye's gaze through the overlaid image; according to 2D FoR. However, similar technique may be used for 3D FoR.

FIG. 5 depicts an active contact lens 501 with an embedded onboard display 502. Display 502 may be of any shape. In one embodiment, display may be round. In an alternate embodiment, display may be square or rectangular, etc. Section 503 shows portion of display where image will be seen in sharp focus. In FIG. 5, base reference is middle of the screen and 504 arrow points to location on the display where some data is displayed. The data section pointed to by 504 arrow is of interest to the user. First, the system takes the base reference, that is, the system determines the position of the eye and current disposition of the image on display. Secondly, with the shift of an eye, as per FIG. 6, the system of an active contact lens 601 correspondingly shifts an image to make it visible on display 602 in focus at section of display 603. FIG. 6 depicts first image adjustment after base reference is determined. Arrow 604 points to the section of superimposed image which is of interest to the user afterwards, as registered by the eye tracking subsystem. The system accordingly adjusts image location on the screen as per exemplary FIG. 7, active contact lens 701, containing display 702 and a shifted image where sought portion of an image data is at the center of the lens at 703 and thus in focus. FIG. 7 depicts second image adjustment after base reference is determined. Once the data ingestion is finished, the image on the screen may be refreshed with new data and base reference may be taken again. Alternatively, if focus of the wearer's eye changes to a different mode, 2D FoR based image may return to its default position.

Thus, the eyes are presented with the wide peripheral vision, and consequent eye movements bring different parts of an image into focus for complete data ingestion. In the present embodiment, the system shifts the image based on the eye movement shift, where eye is concentrating on the image overlaid (2D FoR). For 3D FoR, the scheme is similar but when the 3D FoR is taken into consideration, that is, when tracking changes in the eye direction, the system tracks direction relative to 3D Geometry of real world around the user so that images superimposed onto real world view have association to 3D real world geometry which will shift on display according to 3D shift in the eye direction.

In one embodiment, the responsibility for focus shift may be moved to the display altogether. For example, while user is reading a text overplayed on the embedded display, the text image can be moved relative to the eye without the movement of the eye (stable eye—shifting image); in present disclosure it is also called passive mode.

In one embodiment, predefined trigger that signals that the shift of an overplayed image needs to take place. Example predefined trigger may be hand signal, or sound/command from the user or pressing of the button on the smart phone, eye focus change, etc. In one embodiment, hand gestures may be used to identify the vector and extent of the shift required. For example, the hand gesture may be movement of a hand to the right by 10 cm which would trigger shift of an image to the right by certain proportional measure.

In one embodiment, a time frequency may be defined so that image data shifting on the screen may take place and the image can move accordingly.

The geometry of an image data shift and sequencing of shift may also be predefined or triggered by an external action of the user.

In one embodiment, the system may determine current (2D vs 3D) FoR and hence mode according to which image overlay is computed on display, by actively identifying eye's focus and tracking changes in the eye's accommodation reflex and refocus.

Accommodation reflex is an unconditioned reflex of the eye, caused by the need to refocus on a near or distant object. The human ocular system achieves refocus with a triad of changes: 1) a change of shape of the crystalline lens, 2) a corresponding proportional change in pupil diameter, and 3) a vergence, which is a simultaneous movement of both eyes in opposite directions to obtain single binocular vision. The eyes converge as they focus on a nearby object and diverge when they focus on a distant object. When the subject focuses on a distant object, it also results in the flattening of the crystalline lens and an increased pupil size; whereas when focusing on a nearby object, the crystalline lens becomes more spherical and is accompanied by a decreased pupil size. The change of lens shape is required to change the refractive power of the lens.

The process of accommodation is the process by which an eye changes the shape of its elastic crystalline lens, thereby enabling an eye to focus on an object. Whenever the distance to the object changes, the eye needs to accommodate to change optics of the crystalline lens (optical power of the eye). The optical power of a healthy (young) human eye is about 13 diopters, which enables an eye to change focus from infinite distance to about 7 cm from the eye approximately in 350 milliseconds. There is one kind of muscle that control the shape of the crystalline lens: ciliary muscles which are attached to the lens edges by zonules (ligament fibers that may be stretched). Whenever, zonular fibers relax, the lens becomes more spherical, adjusting to a shorter distance focus and vice versa. Relaxation of the ciliary muscle has opposite effect on zonular fibers and lens flattens, leading to an increase in focal distance and refocusing the lens to a longer range.

Mechanism disclosed in the present invention monitors and identifies the focal length of the crystalline lens and changes of the focal length. Another mechanism disclosed herein, identifies activation of and extent of the ciliary muscle, which is indicative of the change in focal length.

In one non limiting, exemplary embodiment, to track focus of the lens, corresponding focal distance and changes thereof, a specialized sensor integrated into the contact lens facing cornea (rear facing) of the eye is provided. The sensor may be a variety of electromagnetic sensors designed to be sensitive to visible or non-visible spectrum of light.

Furthermore, the system may optionally correlate extent of the accommodation reflex and refocus with the depth image information. Whereas depth information may be actively derived from a variety of depth image sensors, range finders, LIDARs, or any other means of active depth estimation or may be computed passively by 2D image analysis. Information about change in the gaze direction may be coupled with the change in depth map information to compute the expected level of accommodation and corresponding expected focus for the current depth (distance of view). Expected focus may be measured and represented in variety of ways. For example, it can be measured in Diopters or meters or may be described by the shape of crystalline lens at any given time or distance to the object that should be in focus under current shape of crystalline lens. Thus, if the depth of an image directly in front of the eye is 10 meters (distance to an object being looked at), then the eye should accommodate crystalline lens accordingly to focus at 10 meters. When the system detects that crystalline lens does not accommodate for 10 meters of focal depth, it means that the eye is focused on something else, for example image on display; assuming image on display requires different focal depth then the real object at a distance.

In one non limiting, exemplary embodiment, to track focus of the eye, pupil dilation may be tracked. Pupil dilation is conditioned by a number of factors, out of which most important ones are: accommodation reflex (refocus), pupil reflex (adjustment to amount of light), to a smaller effect pupil dilation may be caused by mental task engagement (TERP). Thus, if pupil reflex can be discounted or accounted for by tracking level of luminescence and optionally TERP may be discounted or accounted for, then pupil dilation contributable to refocus may be computed. Thus, pupil dilation may be used to determine change in focus of the eye.

Furthermore, the system may determine whether current focus corresponds to the distance to the object in front of the eye. Change in focus relative to the required focus for current Frame of Reference may serve as the signal indicating that the system needs to switch from the 2D FoR to 3D FoR or vice versa.

Figure 8:
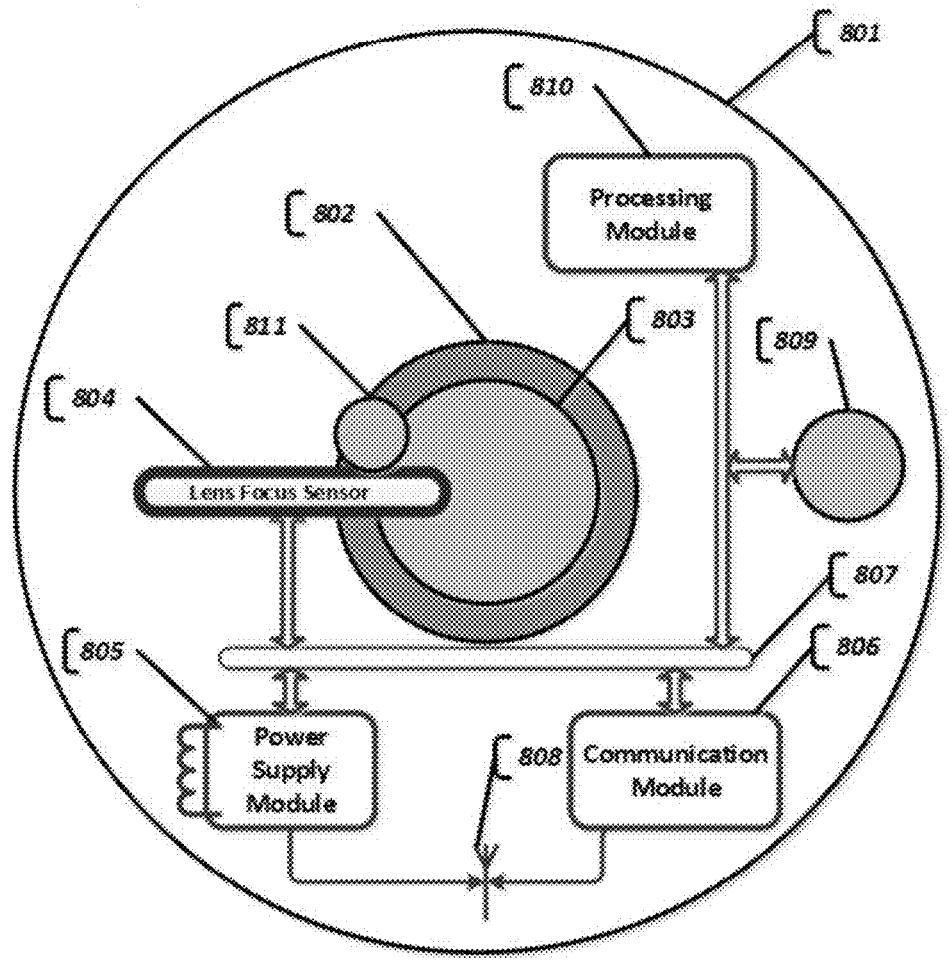
FIG. 8 illustrates a block diagram of a contact lens, in accordance with another embodiment of the present disclosure.

FIG. 8 depicts a contact lens 801 with an integrated eye focus detection sensor (eye crystalline lens focus sensor) 804.

In one embodiment, the eye focus detection sensor 804 may be embedded into the middle of the contact lens substrate and positioned on the either side from cornea of the eye or overlapping cornea 802 or may be positioned over the iris/pupil of the eye. The reference numeral 802 references cornea section of the eye.

In one embodiment, the eye focus detection sensor 804 may be positioned on and be integrated with optionally embedded display 803 into the contact lens substrate.

In one embodiment, the eye focus detection sensor 804 may be embedded into the bottom of the contact lens substrate and be positioned either on the side from the cornea or overlapping cornea.

The eye focus detection sensor 804 may be positioned under such an angle so as to be under certain angle relative to the crystalline lens of the eye.

In one embodiment, the eye focus detection sensor 804 may be implemented as specialized variation of miniaturized CMOS sensor.

Also, the eye focus detection sensor 804 may be implemented as specialized variation of monochrome CMOS sensor optionally coupled with IR emitter (for example, light-emitting diodes—LEDs) 811 embedded into the contact lens, so that the IR emitter may hit the crystalline lens with IR light to be reflected on CMOS sensor. The form/shape image of the lens will be reflected into the CMOS sensor.

The eye focus detection sensor 804 may be implemented as an EM-CCD sensor. Further, the eye focus detection sensor 804 may be implemented as CIS (Contact Image Sensor). Generally, CISs are inferior to CCDs in terms of output image quality produced. However, given CISs uses many times less electric power and a miniaturized CIS sensor may be a good fit for tracking changes in the iris's diameter.

In one embodiment, the eye focus sensor 804 may be implemented with a variation of CCD sensor. Further, the eye focus detection sensor 804 may be implemented as miniaturized HPD (Hybrid photo-detectors). Also, the eye focus detection sensor 804 may be implemented as PIR (Passive Infrared Sensor). These type of sensors detect changes in infrared radiation not requiring visible light.

In one embodiment, the eye focus detection sensor 804 may be implemented as miniaturized capacitance-detection type of infrared sensor utilizing the principle of Golay-cell.

In one embodiment, the eye focus detection may be achieved with an integrated miniaturized Badal Optometer.

Eye focus sensor 804 may be implemented on micro with MEME components or nano scale components.

It should be understood that any other method or type of sensor may be used to identify and detect changes in the shape of the crystalline lens and detect refocus (accommodation). Given here are listings of some of the possible technologies that can be used for detection of crystalline len's shape. However, changes are only exemplary and should not be taken to limiting to the scope of the invention. Multitude of other types of sensors may be employed to function as the eye focus detection sensor 804.

In one non-limiting, exemplary embodiment, the contact lens substrate may integrate power supply module 805 and communication module 806. Contact lens substrate may integrate an RF antenna to support both, communication module 806 needs to send requests and receive responses as well as power supply module 805 to generate electric power from located nearby RF transmitter.

In one non-limiting, exemplary embodiment, power supply module 805 may derive power from other components, such as solar panel, piezoelectric sensors. Electric charge may be stored in an onboard capacitor, battery or electric accumulator.

In one embodiment, the contact lens substrate may integrate processor module 810 that may serve as controller for the display and other embedded electro-optical components. Processor module may be arranged to execute executable code and run variety of programs and application.

Processor module 810 may comprise a) processor, which may be a general purpose processor (CPU), b) operating RAM memory, ROM memory, EPROM memory, EEPROM or DROM memory, and non-volatile RAM (NVRAM) memory, c) permanent memory.

In one embodiment, the processor module 810 may include various miniaturized Micro-Electro-Mechanical Systems (MEMS) or nano scaled based sub-systems.

The processor module 810 may be built with carbon nanotube based crossbar memory, for example Nano-RAM or memristor technology. Any other memory device based on spintronics principle may also be utilized.

In one embodiment, MRAM based on GMR and TMR effects may be utilized for memory construction.

All electronics components of the contact lens may be implemented as MEMS, micro scaled or nano scaled components.

In one embodiment, the contact lens substrate may optionally integrate image capture device 809. Image capture device may be implemented as miniaturized CMOS or CCD sensor. Alternatively, the image capture device may be implemented with miniaturized graphene image sensor. Graphene based image sensor may be implemented as CMOS sensor. Outward facing image capture device, may be used to collect information about the environment being observed by the user.

In one embodiment, the contact lens substrate may integrate control circuit and electronic communication bus 807. Onboard devices may communicate with each other via electronic communication bus 807. Onboard communication bus and electric circuit of the contact lens may be implemented with graphene and nano wires. Wiring may be implemented with graphene or silver nano-wires or other materials that are conducive to transparency needs of the contact lens.

In one embodiment, the processor module 110 may be arranged to process output from the Lens Focus Sensor 804 and determine changes in the shape of the crystalline lens and determine focus of the lens also known as focal distance. This information may be used for various purposes.

In one embodiment, focus information may be used to present targeted information about the object in focus as an overlay on the embedded display.

In one embodiment, focus information may be used to track and monitor subject's eye gaze and subject's interest.

Present invention describes novel methods and apparatus for 3D object mapping, tracking and recognition.

Figure 9:
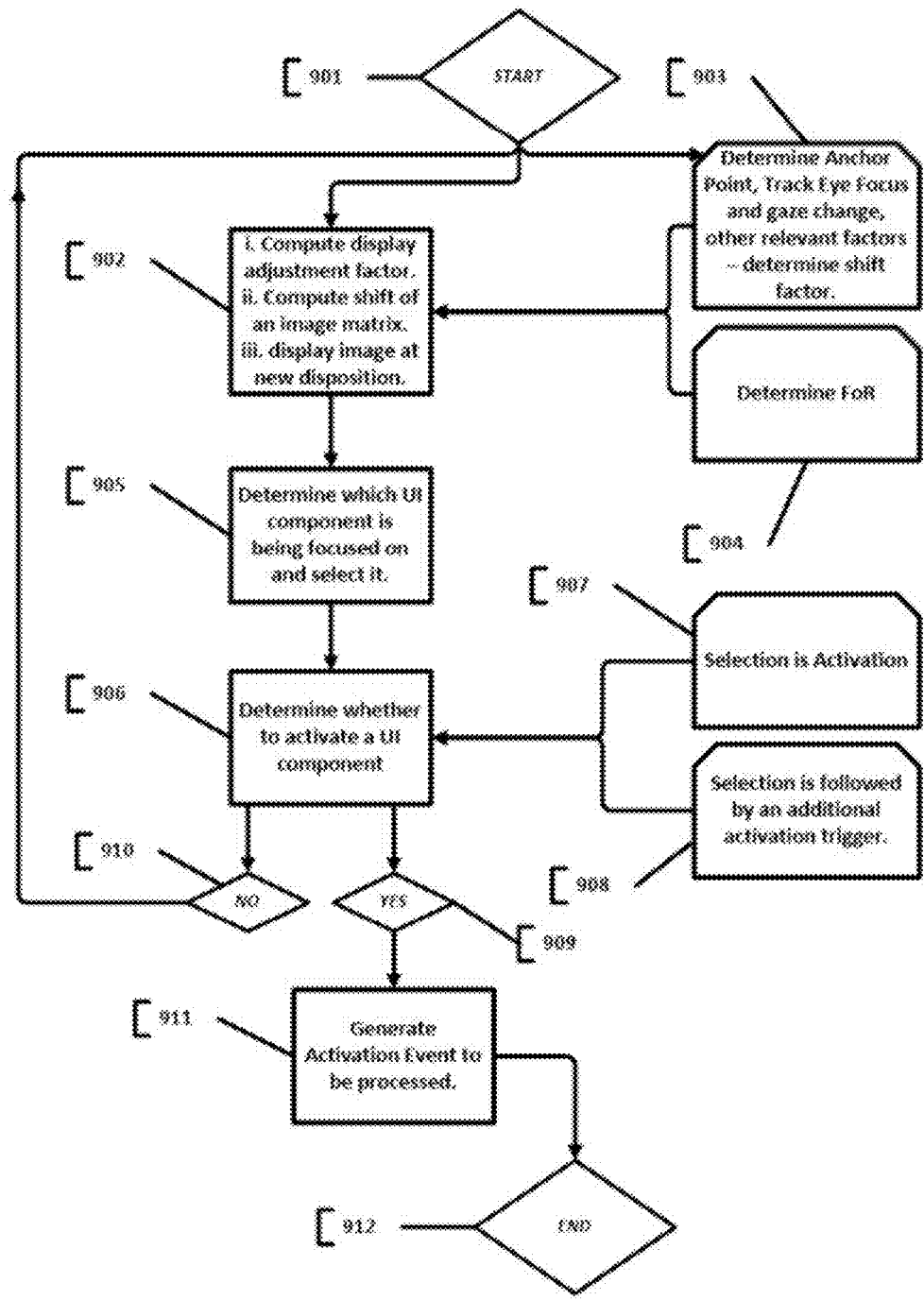
FIG. 9 illustrates another block diagram of a contact lens, in accordance with an embodiment of the present disclosure.

FIG. 9 describes the operational process flow of the smart contact lens system.

The process starts at step 901, the process may start with a blink of an eye or start of RF transmission from near the eye source of RF radiation that activates an onboard power generation component in the contact lens, or any other triggering action or signal. At step 902, the system:
  Computes display adjustment factor
  Computes shift of image matrix
  Displays an image at new disposition on embedded display.

The display adjustment factor is computed based on determined gaze vector change that may be derived in variety of ways, for example tracked gaze change and optionally head position change determined at step 903, the evaluation happens in context of selected FoR, which can be either 2D or 3D, determined at step 904.

At step 905, the system determines which UI component is being focused on. That is, which UI component is moved, by the system, to the center of the embedded display. The system may select the component at the center of display either immediately after it comes to the center of the display, or after predefined timeframe threshold is reached and the user is focusing/looking at the UI control for certain duration of time.

In one non limiting, exemplary embodiment, the selection may be marked by the system by changing appearance of the UI Component selected. For example if there is text on UI control, it may be marked in bold font. Alternately, the border of the UI control may be made more visible and pronounced. Alternately, if UI component is a pixel, it can change color or can be changed to be 2, 3 pixels to be enlarged. There could be any visual cues that the control/component has been selected.

Furthermore, at step 906, the system determines whether to activate UI component or not.

Activation of the UI Component implies triggering event/action presupposed and signified by the UI component, issuing command or event to be executed and processed by the system. For example, activating a red circle UI component may trigger "begin recording" action, in a smart contact lens with an embedded image capture device.

Once UI component is activated, a triggering event is dispatched to the system, that triggering event serves as a command for the system to execute.

In one non limiting, exemplary embodiment, activation may be passive, as per step 907. At step 907, the system activates as soon as the system selects a UI component.

In one non limiting, exemplary embodiment, activation may be actively triggered, at step 908, with an additional action. Physical action may be a blink of an eye, snap of the fingers, voice command to the system, assuming the system integrates voice recognition capability.

In one non limiting, exemplary embodiment, activation, may be actively triggered at step 908, with a hand signal, which is being monitored by depth or color sensors. Multitude of other physical actions can be undertaken to signify activation.

In one non limiting, exemplary embodiment, activation, may be actively triggered, at step 908, based on timeframe trigger, when the UI Component is selected, the system, sets a timer on for certain timeframe threshold. If the user is still focusing on the UI component after predefined timeframe threshold, then activation follows.

It should be understood that steps 907 and 908 may be mutually exclusive for any given type of UI component. Alternatively, steps 907 and 908 may be one and the same action.

If activation takes place at step 909, then at step 911, the system generated a triggering event requiring the system to execute the command implied by the UI component.

In case if activation does not follow the selection, step 910, the system may loop back to tracking the eye gaze and head orientation, eye's focus and determining next anchor point.

The process stops at step 912. There are multitude of ways to signify end of the processes, for example sequence of eye blinks, sequence of hand claps, voice command(s), focusing with the eye on the UI component signifying "Turn Off" command, superimposed on the embedded display, and so on.

Figure 10:
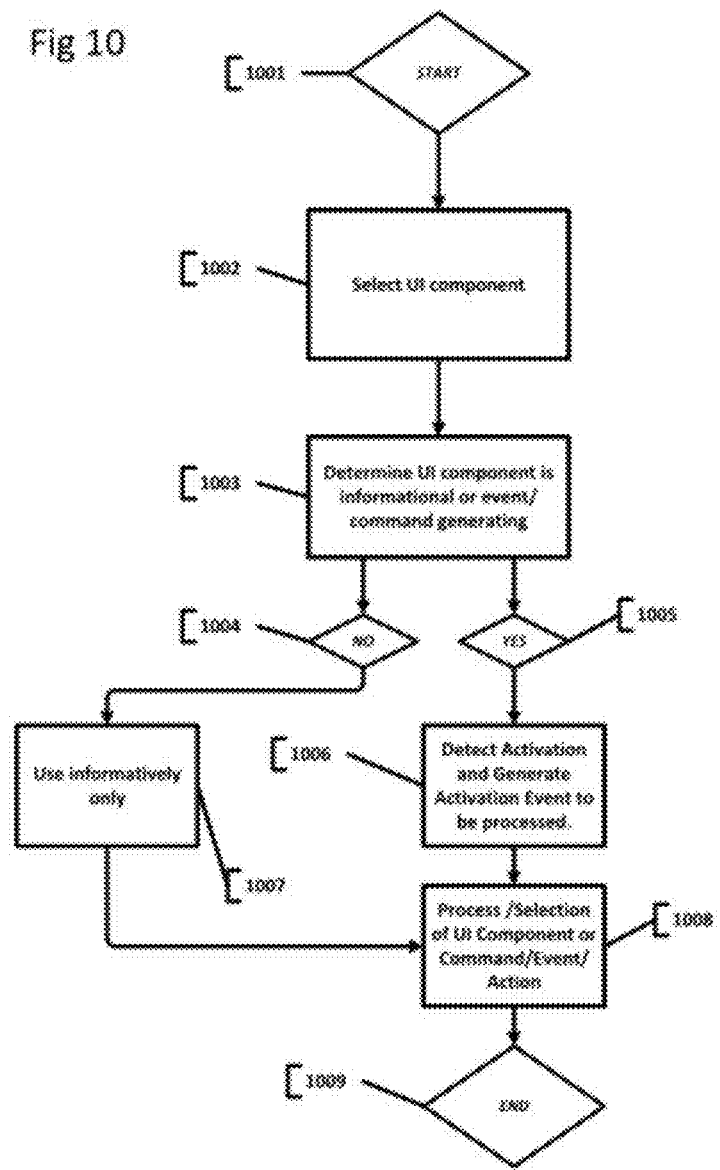
FIG. 10 are flow diagrams illustrating exemplary operation of the contact lens system, in accordance with an embodiment of the present disclosure.

Furthermore, FIG. 10 depicts operational process flow of smart contact lens system. As per one non limiting, exemplary embodiment of present invention, process starts at 1001. The process may be initiated with multitude of signals and methods, for example, predefined sequence of eye blinks, hand claps, voice command, source of RF radiation near the eye being turn on which generates electricity on receiving embedded RF antenna on smart contact lens.

At step 1002 UI component is selected, following selecting anchor point, eye position and focus and optionally head position tracking according to selected FoR.

At step 1003, informational or command generating type of component selected is identified or checked.

At step 1004, if the control is purely informational, for example check box(s), radio box, then the system will use the information selected at step 1007.

At step 1005, the system identifies the UI component as command/action generating event, and actions it at step 1008 as such. At step 1008 the system may action the command taking into consideration any selection of informational UI components. The actual application being executed dictates how informational UI components are interpreted.

The process ends at step 1009. End of the process may be signaled with any activity of turning off of a contact lens, that may be triggered with predefined sequence of eye blinks or hand claps, voice command(s), any other signaling methods and mechanisms may be used.

FIGS. 11, 12, 13 depict the image superimposed on the embedded display and image shift from one position to the other. Furthermore, the three images show progression of UI component selection and activation whenever applicable.

As per FIG. 11, smart contact lens substrate 1101 is depicted. The SCL substrate integrates an embedded display 1102. Section 1103 indicates region on display that may be perceived by the eye in focus. Arrow 1104, indicates the UI control that is of interest to the user where the eyes' gaze vector and focus, shifts. There are several UI components depicted: two radio buttons, a checkbox and two buttons with text "Approve" and "Deny". Arrow 1104, points to user's interest in checkbox.

As per FIG. 12, the system shifts the image disposition on display, to bring UI component of interest into focus at the center of display. 1201 indicates smart contact lens substrate, integrating an embedded display 1202 and 1203 indicates region on display that may be perceived by the eye in focus. Once the user holds eye gaze and focus on the checkbox, the system selects the checkbox and places the check mark into it. Then the arrow 1204, indicates the next interest of the user on display, namely button "Approve".

As per FIG. 13, the system shifts the image disposition on display, to bring UI component of interest into focus at the center of display. 1301 indicates smart contact lens substrate, integrating an embedded display 1302 and 1303 indicates region on display that may be perceived by the eye in focus. At the center of the display button "Approve", when the user keeps the focus and gaze on the button, the system selects it and may either immediately activate the button (press the button) or the system may select the button "Approve" and wait for additional signal to activate the UI component. If activation takes place, the system is notified that the UI component has been activated and appropriate action may be taken by the system.

Figure 14:
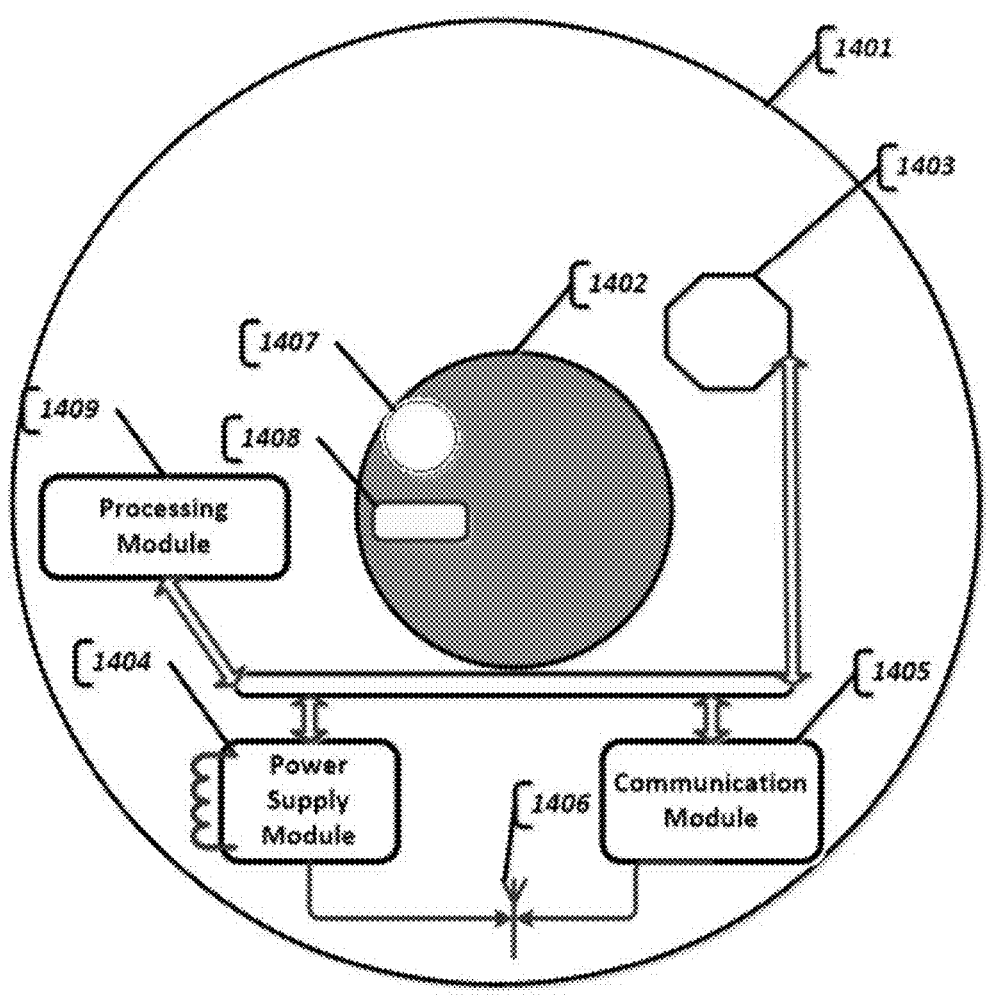
FIG. 14 illustrates a block diagram of a contact lens, in accordance with another embodiment of the present disclosure.

FIG. 14 shows another novel aspect of the present invention. The use of the UI components displayed on the embedded display to control an embedded, onboard image capture device. Smart contact lens substrate 1401 incorporates several electronic and electro optical components. 1402 is an embedded into the contact lens transparent or semi-transparent or non-transparent display. 1403 depicts an image capture device with an integrated focusing lens (not shown here). Contact lens integrates power module 1404. Power module may comprise: RF antenna 1406 based power generator, solar panel, accumulator, battery, capacitor, miniaturized piezoelectric generator and other means of producing and storing electric energy.

Contact lens substrate also comprises a communication module 1405 where communication channel is arranged to communicate with other devices in close proximity. Communication may utilize multitude of protocols like Bluetooth or WiFi or any other communication protocol. Communication module may comprise any kind of communication hardware and software. It may comprise: communication controller, data transmission may be implemented with RF antenna 1406 or light emitter and light receiver, assuming there is headset based or nose based, light transceiver. Other communication hardware platforms are also possible.

FIG. 14 also depicts two UI components featured on display: 1407 Record button that may be depicted in red color or may become red once activated, and 1408 Stop button. Furthermore, contact lens substrate also integrates a processing module 1409. Processing module may comprise MCU, HPU, CPU, any other micro or nano scaled electronic processing component, capable of executing micro programs or programs.

Processor module 1409 may comprise a) processor, which may be a general purpose processor (CPU), b) operating RAM memory, ROM memory, EPROM memory, EEPROM or DROM memory, and non-volatile RAM (NVRAM) memory, c) permanent memory.

In one embodiment, the processor module 1409 may include various miniaturized Micro-Electro-Mechanical Systems (MEMS) or nano scaled based sub-systems.

The processor module 1409 may be built with carbon nanotube based crossbar memory, for example Nano-RAM or memristor technology. Any other memory device based on spintronics principle may also be utilized.

In one embodiment, MRAM based on GMR and TMR effects may be utilized for memory construction.

All electronics components of the contact lens may be implemented as MEMS, micro scaled or nano scaled components.

The smart contact lens system of present disclosure, allows the user to control the image capture device with the eye. Once the eye focus and gaze switches to the on display picture, the image on the screen shifts to bring record button in focus at the center of the display (assuming the user wants to activate image recording or video recording). Once, the image moves to the central disposition on display, the system activates the record button. The system may activate record button with one of many additional activation signals. In one non limiting, exemplary embodiment, it the activation of record button may be timed trigger, where after certain predefined time threshold, the record button activates.

In one non limiting, exemplary embodiment, activation may be achieved with an eye blink, assuming smart contact lens is equipped with variety of blink detecting sensors, for example capacitance sensors.

In one non limiting, exemplary embodiment, activation may be achieved with hands clap in certain sequence.

In one non limiting, exemplary embodiment, activation may be achieved with a voice command.

It should be understood that activation methods provided here are exemplary only and should not be understood as being limiting to the scope of present invention.

In one non limiting, exemplary embodiment, activation implies generation of activation event to which the SCL system responds by turning on image capture device and starting read out from image capture device either in a snapshot mode, in case if taking a picture, or in continuous mode, in case of video being taken.

In one non limiting, exemplary embodiment, picture or video taken may be streamed and transmitted from the contact lens based memory storage to the outside of the contact lens via communication module.

In one non limiting, exemplary embodiment, image read out is performed from image capture device into an onboard memory device, that may be arranged as part of processor module.

Furthermore, when the image capture is activated in continuous mode (video capture mode), it needs to be deactivated. The stop video capture button 1408 needs to be focused on and needs to shift to the center of the embedded display. Once the 1408 UI component moves to the center of display, the SCL system selects it.

In one non limiting, exemplary embodiment, afterwards, selected UI component for stopping recording gets activated and that desists video capture process.

In one non limiting, exemplary embodiment, afterwards the system flashes last image from image capture sensor into memory and optionally stops electric power to an embedded image capture device.

Thus, image capture device may be fully controlled by the eye movement and focus.

What is claimed:

1. A smart contact lens system (SCL) comprising:
   a contact lens substrate movable in synchronism with an eye of a user;
   an embedded display integrated into the said contact lens substrate;
   a processor module configured to select a user interface (UI) component of one or more UI components on a user interface on the said embedded display and optionally trigger the selected UI component, wherein the user interface (UI) component selected is displayed in focus, at the time of selection, on the said embedded display.

2. The smart contact lens system of claim 1, further comprising: an eye position or eye orientation tracking module.

3. The smart contact lens system of claim 1, further comprising: an eye focus tracking module.

4. The smart contact lens system of claim 1, further comprising:
   an external environment tracking module, comprising at least one of an image sensor or depth sensor or range sensor or infrared sensor, configured to track an environment around a user of the smart contact lens system or to track gestures and hand commands of the user of the smart contact lens system.

5. The smart contact lens system of claim 4, further comprising: a the processor module configured to track changes in focus of the eye and identify a UI component of the one or more UI components being looked at and select a UI component of the one or more UI components being looked at.

6. The smart contact lens system of claim 4,
   wherein the processor module tracks body gestures to either shift an image including the UI components on the embedded display to position part of the image including the UI components of interest at the center of the embedded display, in front of the retina of the eye or to select a UI component of the one or more UI components.

7. The smart contact lens system of claim 1, further comprising:
   the processor module configured to determine a UI component of the one or more UI components to be selected or UI component of the one or more UI components to be selected and triggered.

8. The smart contact lens system of claim 1, further comprising:
   the processor module configured to:
   a. determine an anchor point;
   b. track focus changes or eye orientation vector changes;
   c. shift an image including the UI components on the embedded display to position part of the image including the UI components of interest at the center of the embedded display and in front of the retina of the eye;
   d. determine that a criteria for UI component selection has been met and select a UI component of the one or more UI components, by generating a selection event.

9. The smart contact lens system of claim 1, further comprising:
   an integrated, into the contact lens substrate, image capture device;
   the embedded display configured to display the one or more UI components connoting start or stop or pause of image capturing or audio recording commands;
   the processor module, configured to start image capturing on selection of a UI component of the one or more UI components;
   the processor module configured to stop the image capturing on selection of a UI component of the one or more UI components, and
   the processor module configured to pause image capturing on selection of a UI component of the one or more UI components.

10. The smart contact lens system of claim 1 further comprising a focus tracking module which tracks ciliary muscle of the eye and correlating a measured actual focus level of the eye against expected focus level for current depth of the environment.

11. The smart contact lens system of claim 1 further comprising a focus tracking module which identifies and tracks the shape of a crystalline lens of the eye.

12. A smart contact lens system comprising:
   a contact lens substrate movable in synchronism with an eye of a user;
   an embedded display integrated into the said contact lens substrate; and
   a processor module configured to shift an image including UI components on the embedded display to position part of the image including the UI components of interest to the center of the embedded display and select a UI component of one or more UI components on the UI on the embedded display and optionally trigger the selected UI component, wherein the selected UI component is displayed in focus, at the time of selection, on the embedded display.

13. A method of controlling the SCL of claim 1, with an eye, comprising the steps of:

depicting the one or more user interface (UI) components on the embedded display of said contact lens substrate; and selecting or triggering a UI component of the one or more UI components.

14. The method of claim 13, further comprising:
a step of tracking the eye orientation;
computing an image shift factor;
shifting an image including the UI components on the said embedded display using the image shift factor.

15. The method of claim 13, further comprising:
a step of tracking eye focus to determine transition between a frame of reference or to determine an anchor point and a shift factor;
computing the shift factor by measuring the extent of change in the eye gaze's direction.

16. The method of claim 13, further comprising:
a step of tracking an environment of a user to determine the environment around the user.

17. The method of claim 16, further comprising:
wherein the step of tracking environment of the user includes identifying the user's gestures and the user's hand commands.

18. The method of claim 13, further comprising:
a step of controlling an embedded image capture device, by selecting the a UI component of the one or more UI components on the embedded display.

19. The method of claim 18 where the one or more UI components consist of control components selected from a group consisting of start recording, end recording and pause control components.

20. The method of claim 13 where a focus change is detected by tracking ciliary muscle of the eye and correlating the a measured actual focus level of the eye against expected focus level for current depth of the environment.

21. The method of claim 13 where a focus change is detected by identifying or tracking a shape of a crystalline lens of the eye.

* * * * *